(12) United States Patent
Heroux et al.

(10) Patent No.: US 10,585,240 B2
(45) Date of Patent: *Mar. 10, 2020

(54) WAVEGUIDE ARCHITECTURE FOR PHOTONIC NEURAL COMPONENT WITH MULTIPLEXED OPTICAL SIGNALS ON INTER-NODE WAVEGUIDES

(71) Applicant: INTERNATIONAL BUSINESS MACHINES CORPORATION, Armonk, NY (US)

(72) Inventors: Jean Benoit Heroux, Tokyo (JP); Seiji Takeda, Tokyo (JP); Toshiyuki Yamane, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/545,723

(22) Filed: Aug. 20, 2019

(65) Prior Publication Data

US 2019/0369330 A1     Dec. 5, 2019

Related U.S. Application Data

(63) Continuation of application No. 16/241,522, filed on Jan. 9, 2019, now Pat. No. 10,451,798, which is a
(Continued)

(51) Int. Cl.
*G02B 6/12*     (2006.01)
*H04B 10/80*     (2013.01)
(Continued)

(52) U.S. Cl.
CPC ......... *G02B 6/12004* (2013.01); *G02B 6/125* (2013.01); *G02B 6/12007* (2013.01);
(Continued)

(58) Field of Classification Search
CPC .... H04B 10/275; H04B 10/801; H04B 10/50; G02B 6/12007; G02B 2006/12164;
(Continued)

(56) References Cited

U.S. PATENT DOCUMENTS 5,054,873 A    10/1991   Davis et al.
6,694,073 B2 *   2/2004   Golub .................... G02B 6/266
                                                                                      385/18
(Continued)

FOREIGN PATENT DOCUMENTS

CN      101034942 A     9/2007
CN      104422990 A     3/2015
JP       109160895 A     6/1997

OTHER PUBLICATIONS

List of IBM Patents or Patent Applications Treated as Related dated Aug. 20, 2019, 2 pages.
(Continued)

*Primary Examiner* — Juan A Torres
(74) *Attorney, Agent, or Firm* — Tutunjian & Bitetto, P.C.; Vazken Alexanian

(57) ABSTRACT

A photonic neural component including optical transmitters, optical receivers, inter-node waveguides formed on a board, multiplexers configured to multiplex input optical signals onto the inter-node waveguides, transmitting waveguides configured to receive optical signals emitted from the optical transmitters and transmit the received optical signals to the inter-node waveguides via the multiplexers, mirrors to partially reflect optical signals propagating on the inter-node waveguides, receiving waveguides configured to receive reflected optical signals produced by the mirrors and transmit the reflected optical signals to the optical receivers, and filters configured to apply weights to the reflected optical signals. The transmitting waveguides and receiving waveguides are formed on the board such that one of the
(Continued)

transmitting waveguides and one of the receiving waveguides crosses one of the inter-node waveguides with a core of one of the crossing waveguides passing through a core or clad of the other.

20 Claims, 8 Drawing Sheets

Related U.S. Application Data continuation of application No. 15/982,294, filed on May 17, 2018, now Pat. No. 10,222,548, which is a continuation of application No. 15/422,516, filed on Feb. 2, 2017, now Pat. No. 10,031,287.

(51) Int. Cl.
*H04J 14/02* (2006.01)
*H04B 10/275* (2013.01)
*H04B 10/50* (2013.01)
*G02B 6/125* (2006.01)

(52) U.S. Cl.
CPC ........... *H04B 10/275* (2013.01); *H04B 10/50* (2013.01); *H04B 10/801* (2013.01); *H04J 14/02* (2013.01); *G02B 2006/12104* (2013.01); *G02B 2006/12109* (2013.01); *G02B 2006/12123* (2013.01); *G02B 2006/12164* (2013.01)

(58) Field of Classification Search
CPC ...... G02B 2006/12109; G02B 6/12004; G02B 6/125; G02B 2006/12123; G02B 2006/12104; H04J 14/02
USPC ........................................................ 398/200
See application file for complete search history.

(56) References Cited

U.S. PATENT DOCUMENTS

| | | | |
|---|---|---|---|
| 9,082,075 B1 | 7/2015 | Cruz-Albrecht et al. | |
| 9,111,225 B2 | 8/2015 | Hunzinger et al. | |
| 9,171,249 B2 | 10/2015 | Lazar et al. | |
| 2002/0071627 A1* | 6/2002 | Smith | G02B 6/266 385/15 |
| 2006/0216030 A1 | 9/2006 | Kim et al. | |
| 2007/0297802 A1 | 12/2007 | Uchiyama et al. | |
| 2008/0008471 A1* | 1/2008 | Dress | G06E 3/006 398/66 |
| 2011/0158653 A1 | 6/2011 | Mazed | |
| 2011/0268386 A1 | 11/2011 | Morris et al. | |
| 2013/0101256 A1 | 4/2013 | Heroux et al. | |
| 2014/0264400 A1 | 9/2014 | Lipson et al. | |
| 2014/0324747 A1 | 10/2014 | Crowder et al. | |
| 2015/0131991 A1* | 5/2015 | Hattori | H04J 14/0212 398/47 |
| 2017/0302396 A1 | 10/2017 | Tait et al. | |
| 2018/0217328 A1 | 8/2018 | Heroux et al. | |

OTHER PUBLICATIONS

International Search Report issued in PCT/IB2018/050556 dated Apr. 28, 2018, 9 pages.
Bamiedakis et al., "Low Loss and Low Crosstalk Multimode Polymer Waveguide Crossings for High-Speed Optical Interconnects", 2007 Conference on Laser and Electro-Optics. May 6-11, 2007. pp. 1-2.
Fok et al., "Asynchronous spiking photonic neuron for lighwave neuromorphic signal processing", Optic Letters, vol. 37, Issue 16. Aug. 15, 2012. pp. 3309-3311.
Nahmias et al., "Demonstration of an O/E/O Receiverless Link in an Integrated Multi-Channel Laser Neuron", 2016 Conference on Laser and Electro-Optics. Jun. 5-10, 2016. pp. 1-2.
Shastri et al., "Photonic Spike Processing: Ultrafast Laser Neurons and an Integrated Photonic Network", IEEE Photonics Society Newsletter, vol. 28, No. 3. Jun. 1, 2011. pp. 1-11.
Tait et al., "Broadcast and Weight: An Integrated Network for Scalable Photonic Spike Processing", Journal of Lightwave Technology, vol. 32, No. 21. Nov. 1, 2014. pp. 4029-4041.
Vandoorne et al., "Experimental demonstration of reservoir computing on a silicon photonics chip", Nature Communications. Article No. 3541. Mar. 24, 2014. pp. 1-6.
Wang et al., "General optoelectronic computing based on scalable photonic neuromorphic system", 2016 Conference on Lasers and Electro-Optics. Jun. 5-10, 2016. pp. 1-2.
Nahmias et al., "An integrated analog O/E/O link for multi-channel laser neurons", Applied Physics Letters, vol. 108, Issue 15. Apr. 14, 2016. pp. 1-5.
International Search Report Issued in PCT/IB2018/050078 dated Apr. 28, 2018, 10 pages.
United Kingdom Office Action issued on related Application No. GB1911914.8 dated Sep. 17, 2019, 5 pages.
United Kingdom Office Action issued on related Application No. GB1910617.8 dated Sep. 17, 2019, 3 pages.

\* cited by examiner

WAVEGUIDE ARCHITECTURE FOR PHOTONIC NEURAL COMPONENT WITH MULTIPLEXED OPTICAL SIGNALS ON INTER-NODE WAVEGUIDES

BACKGROUND

Technical Field

The present invention generally relates to a waveguide architecture for a photonic neural component, and more particularly to a waveguide architecture for a photonic neural component of a neural network.

Related Art

Non-traditional, neuromorphic computing architectures, such as neural networks and reservoir computing, have shown promise in terms of performance, but conventional electronic approaches to interconnecting neurons have met with some limitations. For example, the IBM TrueNorth system operates with a processing speed in the kHz range due to the need for time multiplexing. Recently, excitable opto-electronics devices have generated interest as a way of potentially lifting this speed limitation. (See, for example, A. N., Tait et al., "Broadcast and Weight: An Integrated Network For Scalable Photonic Spike Processing," J. Light. Tech. 32, 3427, 2014, M. A. Nahmias et al., "An integrated analog O/E/O link for multi-channel laser neurons," Appl. Phys. Lett. 108, 151106 (2016), and K. Vandoorne et al., "Experimental demonstration of reservoir computing on a silicon photonics chip," Nature Communication 5, 3541, 2014). However, such attempts have been limited by very high power consumption and optical loss. Meanwhile, the fabrication of waveguide crossing structures with very low loss has recently become possible. (See, for example, N. Bamiedakis et al., "Low Loss and Low Crosstalk Multimode Polymer Waveguide Crossings for High-Speed Optical Interconnects," 2007 Conference on Lasers and Electro-Optics (CLEO), CMG1).

SUMMARY

In accordance with an embodiment of the present invention, a photonic neural component capable of overcoming the above drawbacks accompanying the related art is provided. The photonic neural component includes a plurality of optical transmitters, a plurality of optical receivers, a plurality of inter-node waveguides formed on a board, a plurality of multiplexers formed on the board, each multiplexer configured to multiplex an input optical signal onto an inter-node waveguide of the plurality of inter-node waveguides, a plurality of transmitting waveguides formed on the board such that at least one of the transmitting waveguides crosses at least one of the inter-node waveguides with a core of one of the crossing waveguides passing through a core or a clad of the other, each transmitting waveguide optically connected to an optical transmitter of the plurality of optical transmitters and configured to receive an optical signal emitted from the optical transmitter and transmit the received optical signal to an inter-node waveguide of the plurality of inter-node waveguides via a multiplexer of the plurality of multiplexers, a plurality of mirrors formed on the board, each mirror to partially reflect an optical signal propagating on an inter-node waveguide of the plurality of inter-node waveguides to provide a reflected optical signal, a plurality of receiving waveguides formed on the board such that at least one of the receiving waveguides crosses at least one of the inter-node waveguides with a core of one of the crossing waveguides passing through a core or a clad of the other, each receiving waveguide optically connected to an optical receiver of the plurality of optical receivers and configured to receive a reflected optical signal produced by a mirror of the plurality of mirrors and transmit the reflected optical signal to the optical receiver, and a plurality of filters formed on the board, each filter configured to apply a weight to a reflected optical signal produced by a mirror of the plurality of mirrors before the reflected optical signal is transmitted to an optical receiver by the receiving waveguide that receives the reflected optical signal. The photonic neural component may support design flexibility while lifting the speed restriction of the conventional electronic approach.

In accordance with an embodiment of the present invention, the plurality of optical transmitters may include a first optical transmitter that emits an optical signal at a first wavelength and a second optical transmitter that emits an optical signal at a second wavelength different from the first wavelength, and the inter-node waveguides may include an inter-node waveguide that propagates the optical signal at the first wavelength and the optical signal at the second wavelength. The plurality of mirrors may include a mirror whose reflection coefficient depends on wavelength. The plurality of filters may include a spectral filter whose applied weight depends on wavelength. A photonic neural component with these features may support wavelength division multiplexing (WDM) of optical signals on the inter-node waveguides, reducing the number of inter-node waveguides necessary.

In accordance with an embodiment of the present invention, the plurality of multiplexers include a multiplexer having an entrance mirror and a y-shaped waveguide structure connected by a first entrance arm and an exit arm to the inter-node waveguide onto which the multiplexer multiplexes its input signal, the entrance mirror configured to receive, as the input signal, an optical signal transmitted by a transmitting waveguide of the plurality of waveguides and reflect the input signal to produce a reflected optical signal that enters a second entrance arm of the y-shaped waveguide structure and joins an optical signal propagating on the inter-node waveguide where the second entrance arm meets the first entrance arm of the y-shaped waveguide structure. The photonic neural component may support multiplexing of optical signals on the inter-node waveguides, thereby reducing the number of inter-node waveguides necessary.

In accordance with an embodiment of the present invention, the plurality of filters include an exchangeable filter that can be exchanged to change the applied weight. The photonic neural component may support tuning of a neural network comprising the photonic neural component.

In accordance with an embodiment of the present invention, the plurality of filters include a variable filter whose transparency can be varied to change the applied weight. The photonic neural component may support tuning of a neural network comprising the photonic neural component.

In accordance with an embodiment of the present invention, the photonic neural component further includes a plurality of semiconductor chips mounted on the board, each of the semiconductor chips including at least one of the optical transmitters or at least one of the optical receivers. The photonic neural component may further support design flexibility.

In accordance with an embodiment of the present invention, the plurality of semiconductor chips include optical transmitter chips and optical receiver chips, each of the optical transmitter chips including one or more of the optical transmitters and each of the optical receiver chips including one or more of the optical receivers, and the optical transmitter chips include a first optical transmitter chip whose one or more optical transmitters emit optical signals at a first wavelength and a second optical transmitter chip whose one or more optical transmitters emit optical signals at a second wavelength different from the first wavelength. Each of the optical transmitter chips include the same number of optical transmitters, each of the optical receiver chips include the same number of optical receivers, the number of optical transmitters included in each of the optical transmitter chips may be the same as the number of optical receivers included in each of the optical receiver chips, and the number of inter-node waveguides connected to each of the optical transmitter chips via the transmitting waveguides may be the same as the number of optical transmitters included in each of the optical transmitter chips and the number of optical receivers included in each of the optical receiver chips. The photonic neural component may support design flexibility and multiplexing of optical signals on the inter-node waveguides, reducing the number of inter-node waveguides necessary.

In accordance with an embodiment of the present invention, each of the semiconductor chips can be arranged such that the at least one optical transmitter included in the chip or the at least one optical receiver included in the chip faces the board, the transmitting waveguides can be connected to the optical transmitters via entry mirrors arranged to redirect light from a direction perpendicular to the board to a direction parallel to the board, and the receiving waveguides can be connected to the optical receivers via exit mirrors arranged to redirect from a direction parallel to the board to a direction perpendicular to the board. The photonic neural component may further support design flexibility by supporting the use of waveguides formed on the board.

In accordance with an embodiment of the present invention, the photonic neural component further includes a plurality of intra-node signal lines, each intra-node signal line connected to an optical receiver of the plurality of optical receivers and an optical transmitter of the plurality of optical transmitters and configured to receive an electrical signal representing a power of an optical signal received by the optical receiver and transmit the electrical signal to the optical transmitter, thereby connecting the optical receiver and the optical transmitter to form an input and an output of a neuron. For each of the optical receivers connected to an optical transmitter via an intra-node signal line, the plurality of mirrors include a mirror whose reflected optical signal is transmitted to the optical receiver and whose reflection coefficient is substantially zero for a wavelength of the optical signal emitted by the optical transmitter. The photonic neural component may support functionality of the photonic neural component as a neural network or portion thereof.

In accordance with an embodiment of the present invention, the inter-node waveguides, the transmitting waveguides, and the receiving waveguides may be made of polymer in a single layer of the board. The photonic neural component may support design flexibility while reducing optical loss.

In accordance with an embodiment of the present invention, the plurality of optical transmitters are divided into differential pairs in which one of the optical transmitters of a differential pair emits a variable optical signal while the other of the optical transmitters of the differential pair emits a reference optical signal. The photonic neural component may further include a plurality of semiconductor chips mounted on the board, each of the semiconductor chips including one or more of the differential pairs. Each of the semiconductor chips can include two or more of the differential pairs. The photonic neural component may support functionality of the photonic neural component as a neural network or portion thereof.

In accordance with an embodiment of the present invention, the plurality of inter-node waveguides includes a first ring having two or more of the inter-node waveguides arranged as concentric loops, the plurality of optical transmitters can include a first inner optical transmitter group having two or more of the optical transmitters disposed inside the first ring, and the plurality of optical receivers can include a first inner optical receiver group having two or more of the optical receivers disposed inside the first ring. The photonic neural component may support input/output functionality and expandability of the photonic neural component as a neural network or portion thereof.

In accordance with an embodiment of the present invention, the plurality of mirrors include a first mirror group, each mirror of the first mirror group to partially reflect an optical signal propagating on an inter-node waveguide of the first ring to provide a reflected optical signal, and the photonic neural component may further include a plurality of first output waveguides formed on the board such that at least one of the first output waveguides crosses at least one of the inter-node waveguides of the first ring with a core of one of the crossing waveguides passing through a core or a clad of the other, each first output waveguide connected to outside the first ring and configured to receive a reflected optical signal produced by a mirror of the first mirror group and transmit the reflected optical signal to outside the first ring. The photonic neural component may further include a first output filter formed on the board, the first output filter configured to apply a weight to a reflected optical signal produced by a mirror of the plurality of mirrors before the reflected optical signal is transmitted to outside the first ring by the first output waveguide that receives the reflected optical signal. The plurality of optical receivers can include a first outer optical receiver group having two or more of the optical receivers disposed outside the first ring, each of the optical receivers of the first outer optical receiver group connected to a first output waveguide of the plurality of first output waveguides and configured to receive the reflected optical signal transmitted by the first output waveguide. The plurality of inter-node waveguides can include a second ring having two or more of the inter-node waveguides arranged as concentric loops, the plurality of optical transmitters may include a second inner optical transmitter group having two or more of the optical transmitters disposed inside the second ring and a second outer optical transmitter group having two or more of the optical transmitters disposed outside the second ring, the plurality of optical receivers may include a second optical receiver group having two or more of the optical receivers disposed inside the second ring, the plurality of multiplexers may include a second multiplexer group, each multiplexer of the second multiplexer group configured to multiplex an input optical signal onto an inter-node waveguide of the second ring, the photonic neural component may further include a plurality of second input waveguides formed on the board such that at least one of the second input waveguides crosses at least one of the inter-node waveguides of the second ring with a core of one of the crossing waveguides passing through a core or a clad of the other, each second input waveguide optically connected to an optical transmitter of the second outer optical transmitter group and configured to receive an optical signal emitted from the optical transmitter and transmit the received optical signal to an inter-node waveguide of the second ring via a multiplexer of the second multiplexer group, and the plurality of intra-node signal lines may include a plurality of inter-ring intra-node signal lines, each inter-ring intra-node signal line connected to an optical receiver of the first outer optical receiver group and an optical transmitter of the second outer optical transmitter group and configured to receive an electrical signal representing a power of an optical signal received by the optical receiver and transmit the electrical signal to the optical transmitter, thereby connecting the optical receiver and the optical transmitter to form an input and an output of a neuron. The photonic neural component may support input/output functionality and expandability of the photonic neural component as a neural network or portion thereof.

In accordance with an embodiment of the present invention, the plurality of multiplexers include a first multiplexer group, each multiplexer of the first multiplexer group configured to multiplex an input optical signal onto an inter-node waveguide of the first ring, and the photonic neural component further including a plurality of first input waveguides formed on the board such that at least one of the first input waveguides crosses at least one of the inter-node waveguides of the first ring with a core of one of the crossing waveguides passing through a core or a clad of the other, each first input waveguide connected to outside the first ring and configured to receive an optical signal from outside the first ring and transmit the received optical signal to an inter-node waveguide of the first ring via a multiplexer of the first multiplexer group. The plurality of optical transmitters can include a first outer optical transmitter group having two or more of the optical transmitters disposed outside the first ring, each of the first optical transmitters of the first outer optical transmitter group optically connected to a first input waveguide of the plurality of first input waveguides and configured to emit an optical signal to be transmitted by the first input waveguide. The plurality of inter-node waveguides can include a second ring having two or more of the inter-node waveguides arranged as concentric loops, the plurality of optical transmitters can include a second inner optical transmitter group having two or more of the optical transmitters disposed inside the second ring, the plurality of optical receivers can include a second optical receiver group having two or more of the optical receivers disposed inside the second ring and a second outer optical receiver group having two or more of the optical receivers disposed outside the second ring, the plurality of mirrors can include a second mirror group, each mirror of the second mirror group configured to partially reflect an optical signal propagating on an inter-node waveguide of the second ring to provide a reflected optical signal, the photonic neural component can further include a plurality of second output waveguides formed on the board such that at least one of the second output waveguides crosses at least one of the inter-node waveguides of the second ring with a core of one of the crossing waveguides passing through a core or a clad of the other, each second output waveguide optically connected to an optical receiver of the second outer optical receiver group and configured to receive a reflected optical signal produced by a mirror of the second mirror group and transmit the reflected optical signal to the optical receiver, and the plurality of intra-node signal lines may include a plurality of inter-ring intra-node signal lines, each inter-ring intra-node signal line connected to an optical transmitter of the first outer optical receiver group and an optical receiver of the second outer optical receiver group and configured to receive an electrical signal representing a power of an optical signal received by the optical receiver and transmit the electrical signal to the optical transmitter, thereby connecting the optical receiver and the optical transmitter to form an input and an output of a neuron. The photonic neural component may support input/output functionality and expandability of the photonic neural component as a neural network or portion thereof.

The summary clause does not necessarily describe all of the features of the embodiments of the present invention. The present invention may also be a combination or sub-combination of the features described above, including a combination of features from two or more of the aspects described above. The above and other features and advantages of the present invention will become more apparent from the following description of the embodiments, taken in conjunction with the accompanying drawings.

DETAILED DESCRIPTION

Hereinafter, example embodiments of the present invention will be described. The embodiments should not be construed as limiting the scope of the invention, which is defined by the claims. The combinations of features described in the embodiments are not necessarily essential to the invention.

Figure 1:
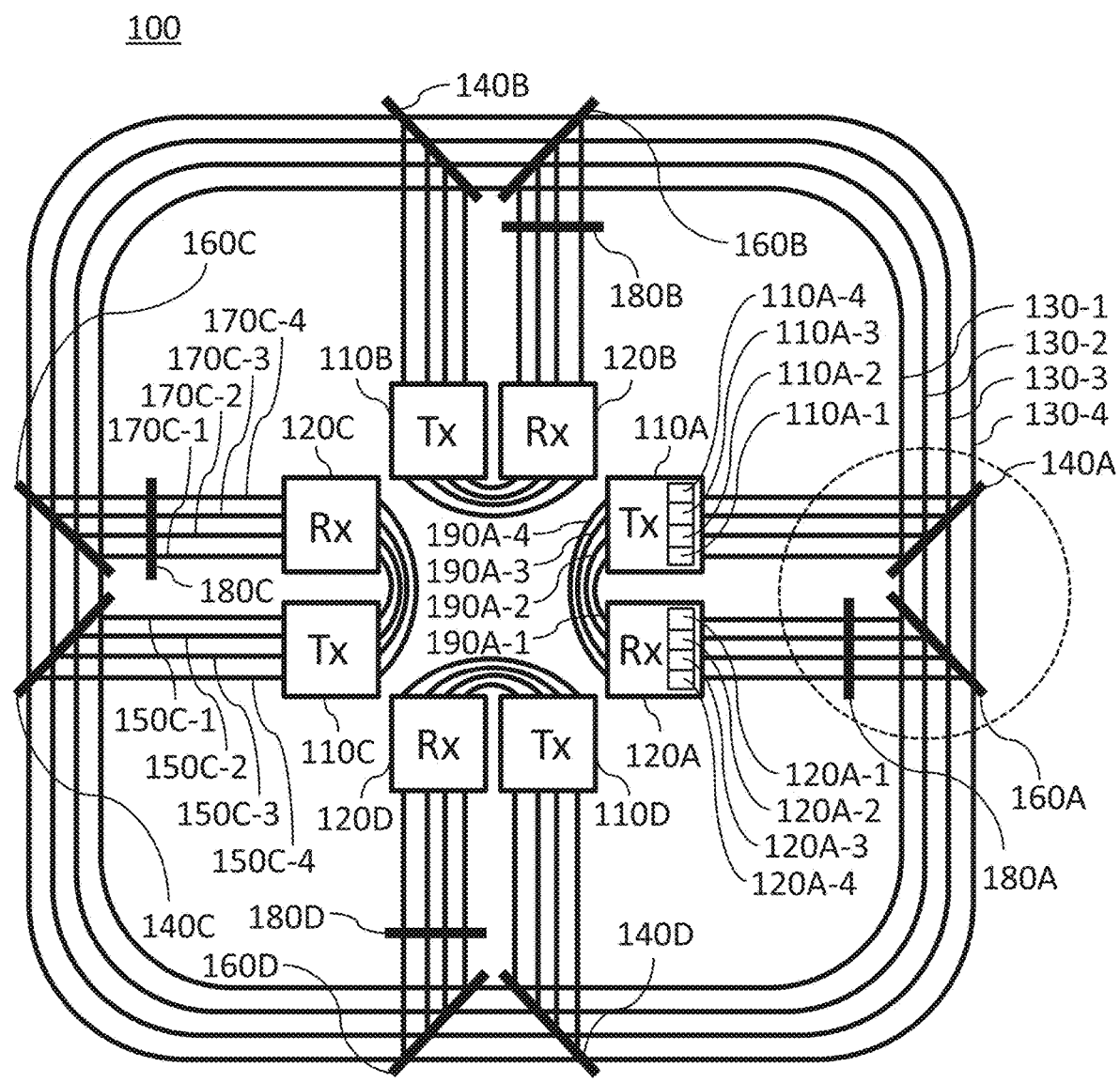
FIG. 1 shows an example schematic of a waveguide architecture for a photonic neural component according to an embodiment of the present invention.

FIG. 1 shows an example schematic of a waveguide architecture for a photonic neural component 100 according to an embodiment of the invention. Using the waveguide architecture shown in FIG. 1, a photonic neural component 100 can support photonic spike computing by optical signal transmission with low loss via waveguides formed so as to cross one another on a board, e.g., a printed circuit board. The disclosed waveguide architecture can, therefore, allow for design flexibility (e.g., layout, materials, etc.) while lifting the speed restriction of the conventional electronic approach. The photonic neural component 100 includes a plurality of optical transmitter chips 110A to 110D, a plurality of optical receiver chips 120A to 120D, a plurality of inter-node waveguides 130-1 to 130-4, a plurality of multiplexers 140A to 140D, a plurality of transmitting waveguides 150A-1 to 150D-4, a plurality of mirrors 160A to 160D, a plurality of receiving waveguides 170A-1 to 170D-4, a plurality of filters 180A to 180D, and a plurality of intra-node signal lines 190A-1 to 190D-4. Due to limited space, out of the plurality of transmitting waveguides 150A-1 to 150D-4, only transmitting waveguides 150C-1 to 150C-4 are given reference numbers in FIG. 1. Similarly, out of the plurality of receiving waveguides 170A-1 to 170D-4 only receiving waveguides 170C-1 to 170C-4 are given reference numbers in FIG. 1, and out of the plurality of intra-node signal lines 190A-1 to 190D-4 only intra-node signal lines 190A-1 to 190A-4 are given reference numbers in FIG. 1. Nevertheless, the omitted reference numbers of transmitting waveguides, receiving waveguides, and intra-node signal lines depicted in FIG. 1 may be referred to throughout this disclosure with the understanding that the letter suffixes A through D refer to corresponding optical transmitter chips 110A to 110D and optical receiver chips 120A to 120D and the understanding that the number suffixes -1 through -4 refer to corresponding inter-node waveguides 130-1 to 130-4.

The optical transmitter chip 110A includes a plurality of optical transmitters 110A-1 to 110A-4. The optical transmitter chips 110B, 110C, and 110D similarly include a plurality of optical transmitters 110B-1 to 110B-4, 110C-1 to 110C-4, and 110D-1 to 110D-4, respectively, but for ease of illustration only the optical transmitters 110A-1 to 110A-4 are shown. Each of the optical transmitters 110A-1 to 110D-4 may be, for example, a vertical-cavity surface-emitting laser (VCSEL), such that each of the optical transmitter chips 110A to 110D may include a VCSEL array having VCSELs as the optical transmitters included therein. The optical signals emitted by the plurality of optical transmitters in one of the optical transmitter chips 110A to 110D may be emitted at a different wavelength than the optical signals emitted by the plurality of optical transmitters in another of the optical transmitter chips 110A to 110D. Thus, the plurality of optical transmitters 110A-1 to 110D-4 may include a first optical transmitter 110A-1 that emits an optical signal at a first wavelength and a second optical transmitter 110B-1 that emits an optical signal at a second wavelength different from the first wavelength. The optical transmitter chips 110A to 110D may be semiconductor chips mounted on a board, e.g., a printed circuit board. In this way, a plurality of semiconductor chips mounted on a board may include optical transmitter chips (e.g., optical transmitter chips 110A and 110B), each of the optical transmitter chips including one or more optical transmitters (e.g., optical transmitter 110A-1 of optical transmitter chip 110A, optical transmitter 110B-1 of optical transmitter chip 110B), and the optical transmitter chips may include a first optical transmitter chip (e.g., optical transmitter chip 110A) whose one or more optical transmitters emit optical signals at a first wavelength and a second optical transmitter chip (e.g., optical transmitter chip 110B) whose one or more optical transmitters emit optical signals at a second wavelength different from the first wavelength.

The plurality of optical transmitters 110A-1 to 110D-4 may be divided into differential pairs in which one of the optical transmitters of a differential pair emits a variable optical signal while the other of the optical transmitters of the differential pair emits a reference optical signal. For example, the first and second optical transmitters (e.g., optical transmitters 110A-1 and 110A-2) of each optical transmitter chip (e.g., optical transmitter chip 110A) may be a differential pair emitting a variable optical signal and a reference optical signal, respectively. In this way, each of the optical transmitter chips 110A to 110D may include one or more differential pairs of optical transmitters. Similarly, the third and fourth optical transmitters (e.g., optical transmitters 110A-3 and 110A-4) of each optical transmitter chip (e.g., optical transmitter chip 110A) may be a differential pair emitting a variable optical signal and a reference optical signal, respectively. Thus, each of the optical transmitter chips 110A to 110D may include two or more differential pairs of optical transmitters. Among a differential pair of optical transmitters 110A-1 and 110A-2 as an example, optical transmitter 110A-1 may emit a variable optical signal having a variable power of "SigA1" and optical transmitter 110A-2 may emit a reference optical signal having a constant power of "RefA1," so that this differential pair can transmit a signal value corresponding to differential power of SigA1-RefA1. Alternatively, among the differential pair, optical transmitter 110A-1 may emit a variable optical signal "SigA1_positive" and optical transmitter 110A-2 may emit a variable optical signal "SigA1_negative," which is an inverted signal of "SigA1_positive." In this implementation, the signal value can be calculated by ½ (SigA1_positive-SigA1_negative). As described in this disclosure, one of these signals (the positive or the negative) may be referred to as "variable" while the other is referred to as "reference."

The optical receiver chip 120A includes a plurality of optical receivers 120A-1 to 120A-4. The optical receiver chips 120B, 120C, and 120D similarly include a plurality of optical receivers 120B-1 to 120B-4, 120C-1 to 120C-4, and 120D-1 to 120D-4, respectively, but for ease of illustration only the optical receivers 120A-1 to 120A-4 are shown. Each of the optical receivers 120A-1 to 120D-4 may be, for example, a photodiode, such that each of the optical receiver chips 120A to 120D may include a photodiode array having photodiodes as the optical receivers included therein. The optical receiver chips 120A to 120D may be semiconductor chips mounted on a board, e.g., a printed circuit board. The board may be the same board on which the optical transmitter chips 110A to 110D are mounted. In this way, a plurality of semiconductor chips mounted on a board may include optical receiver chips (e.g., optical receiver chips 120A and 120B), each of the optical receiver chips including one or more optical receivers (e.g., optical receiver 120A-1 of optical receiver chip 120A, optical receiver 120B-1 of optical receiver chip 120B). More generally, each of the semiconductor chips mounted on the board may include at least one of the optical transmitters (e.g., optical transmitter 110A-1) or at least one of the optical receivers (e.g., optical receiver 120A-1).

The plurality of inter-node waveguides 130-1 to 130-4 are formed on a board, e.g., a printed circuit board, and may be made of polymer in a single layer of the board. (Note that "on" a board is not limited to formation in an upper layer of the board and includes formation inside the board.) The plurality of inter-node waveguides 130-1 to 130-4 may be formed on the same board on which the optical transmitter chips 110A to 110D and/or optical receiver chips 120A to 120D are mounted. The plurality of inter-node waveguides 130-1 to 130-4 may be arranged as concentric loops, e.g., circles, ovals, ellipses, rounded squares or rectangles, rounded pentagons, or any other rounded polygons or other shapes that can be arranged as concentric loops. In a case where the plurality of optical transmitters 110A-1 to 110D-4 includes a first optical transmitter 110A-1 that emits an optical signal at a first wavelength and a second optical transmitter 110B-1 that emits an optical signal at a second wavelength different from the first wavelength, the inter-node waveguides 130-1 to 130-4 may include an inter-node waveguide that propagates the optical signal at the first wavelength and the optical signal at the second wavelength. All of the inter-node waveguides 130-1 to 130-4 may propagate optical signals at multiple wavelengths.

The plurality of multiplexers 140A to 140D are formed on a board, e.g., a printed circuit board, each multiplexer 140A to 140D configured to multiplex an input optical signal onto an inter-node waveguide of the plurality of inter-node waveguides 130-1 to 130-4. For example, the multiplexer 140A may be configured to multiplex input optical signals onto each of the inter-node waveguides 130-1 to 130-4. Similarly, each of the multiplexers 140B to 140D may be configured to multiplex input optical signals onto each of the inter-node waveguides 130-1 to 130-4. The plurality of multiplexers 140A to 140D may be formed on the same board on which the inter-node waveguides 130-1 to 130-4 are formed and/or the same board on which the optical transmitter chips 110A to 110D and/or optical receiver chips 120A to 120D are mounted.

The plurality of transmitting waveguides 150A-1 to 150D-4 are formed on a board, e.g., a printed circuit board, such that at least one of the transmitting waveguides 150A-1 to 150D-4 crosses at least one of the inter-node waveguides 130-1 to 130-4 with a core of one of the crossing waveguides passing through a core or a clad of the other. The plurality of transmitting waveguides 150A-1 to 150D-4 may be formed on the same board on which the inter-node waveguides 130-1 to 130-4 are formed and/or the same board on which the optical transmitter chips 110A to 110D and/or optical receiver chips 120A to 120D are mounted. The transmitting waveguides 150A-1 to 150D-4 and inter-node waveguides 130-1 to 130-4 may be made of polymer in a single layer of the board. Each transmitting waveguide 150A-1 to 150D-4 may be optically connected to an optical transmitter of the plurality of optical transmitters 110A-1 to 110D-4 and configured to receive an optical signal emitted from the optical transmitter and transmit the received optical signal to an inter-node waveguide of the plurality of inter-node waveguides 130-1 to 130-4 via a multiplexer of the plurality of multiplexers 140A to 140D. In the example shown in FIG. 1, the transmitting waveguide 150A-1 (reference numeral omitted), which does not cross any of the inter-node waveguides 130-1 to 130-4, is optically connected to the optical transmitter 110A-1 (as schematically illustrated by its positioning) and configured to receive an optical signal emitted from the optical transmitter 110A-1 and transmit the received optical signal to the inter-node waveguide 130-1 via the multiplexer 140A. Similarly, the transmitting waveguide 150A-2 (reference numeral omitted) is optically connected to the optical transmitter 110A-2 and configured to receive an optical signal emitted from the optical transmitter 110A-2 and transmit the received optical signal to the inter-node waveguide 130-1 via the multiplexer 140A. However, unlike the transmitting waveguide 150A-1, the transmitting waveguide 150A-2 crosses at least one of the inter-node waveguides 130-1 to 130-4, namely the inter-node waveguide 130-1. By virtue of the transparency of the transmitting waveguide 150A-2 and the inter-node waveguide 130-1, the core of the transmitting waveguide 150A-2 may pass through the core or the clad of the inter-node waveguide 130-1 on the way to the inter-node waveguide 130-2. Alternatively, the core of the inter-node waveguide 130-1 may pass through the core or the clad of the transmitting waveguide 150A-2. To reduce cross talk of optical signals between crossing waveguides (e.g., part of an optical signal from one waveguide combining with an optical signal in the other waveguide), the angle between the crossing waveguides at the crossing point may be close to or substantially 90 degrees. Just as the transmitting waveguides 150A-1 and 150A-2 are optically connected to and configured to receive optical signals emitted from respective optical transmitters 110A-1 and 110A-2 and transmit the received optical signals to respective inter-node waveguides 130-1 and 130-2, the plurality of transmitting waveguides 150A-1 to 150D-4 may be optically connected to and configured to receive optical signals emitted from respective optical transmitters 110A-1 to 110D-4 and transmit the received optical signals to inter-node waveguides 130-1 to 130-4 with the understanding that the letter suffixes A through D refer to corresponding optical transmitter chips 110A to 110D and the understanding that the number suffixes -1 through -4 refer to corresponding optical transmitters 110A-1 to 110D4 and inter-node waveguides 130-1 to 130-4.

The plurality of mirrors 160A to 160D are formed on a board, e.g., a printed circuit board, each mirror 160A to 160D arranged to partially reflect an optical signal propagating on an inter-node waveguide of the plurality of inter-node waveguides 130-1 to 130-4 to produce a reflected optical signal. For example, the mirror 160A may partially reflect optical signals propagating on each of the inter-node waveguides 130-1 to 130-4. Similarly, each of the mirrors 160B to 160D may partially reflect optical signals propagating on each of the inter-node waveguides 130-1 to 130-4. As used throughout this disclosure, the term "minor" may refer to a plurality of mirror elements arranged as a mirror array. For example, the mirror 160A may include a plurality of mirror elements that separately reflect the optical signals propagating on each of the inter-node waveguides 130-1, 130-2, 130-3, and 130-4 or a plurality thereof. Also, the term "mirror" may refer to a single mirror element of such a mirror array. The plurality of mirrors 160A to 160D may be formed on the same board on which the inter-node waveguides 130-1 to 130-4 are formed and/or the same board on which the optical transmitter chips 110A to 110D and/or optical receiver chips 120A to 120D are mounted.

The plurality of receiving waveguides 170A-1 to 170D-4 are formed on a board, e.g., a printed circuit board, such that at least one of the receiving waveguides 170A-1 to 170D-4 crosses at least one of the inter-node waveguides 130-1 to 130-4 with a core of one of the crossing waveguides passing through a core or a clad of the other. The plurality of receiving waveguides 170A-1 to 170D-4 may be formed on the same board on which the inter-node waveguides 130-1 to 130-4 are formed and/or the same board on which the optical transmitter chips 110A to 110D and/or optical receiver chips 120A to 120D are mounted. The receiving waveguides 170A-1 to 170D-4, transmitting waveguides 150A-1 to 150D-4, and inter-node waveguides 130-1 to 130-4 may be made of polymer in a single layer of the board. Each receiving waveguide 170A-1 to 170D-4 may be optically connected to an optical receiver of the plurality of optical receivers 120A-1 to 120D-4 and configured to receive a reflected optical signal produced by a mirror of the plurality of mirrors 160A to 160D and transmit the reflected optical signal to the optical receiver. In the example shown in FIG. 1, the receiving waveguide 170A-1 (reference numeral omitted), which does not cross any of the inter-node waveguides 130-1 to 130-4, is optically connected to the optical receiver 120A-1 and configured to receive a reflected optical signal produced by the mirror 160A and transmit the reflected optical signal to the optical receiver 120A-1. Similarly, the receiving waveguide 170A-2 (reference numeral omitted) is optically connected to the optical receiver 120A-2 and configured to receive a reflected optical signal produced by the mirror 160A and transmit the reflected optical signal to the optical receiver 120A-2. However, unlike the receiving waveguide 170A-1, the receiving waveguide 170A-2 crosses at least one of the inter-node waveguides 130-1 to 130-4, namely the inter-node waveguide 130-1. By virtue of the transparency of the receiving waveguide 170A-2 and the inter-node waveguide 130-1, the core of the receiving waveguide 170A-2 may pass through the core or the clad of the inter-node waveguide 130-1 on the way to the optical receiver 120A-2. Alternatively, the core of the inter-node waveguide 130-1 may pass through the core or the clad of the receiving waveguide 170A-2. To reduce cross talk of optical signals between crossing waveguides (e.g., part of an optical signal from one waveguide combining with an optical signal in the other waveguide), the angle between the crossing waveguides at the crossing point may be close to or substantially 90 degrees. Just as the receiving waveguides 170A-1 and 170A-2 are optically connected to respective optical receivers 120A-1 and 120A-2 and configured to receive reflected optical signals produced by the mirror 160A and transmit the reflected optical signals to the respective optical receivers 120A-1 and 120A-2, the plurality of transmitting waveguides 170A-1 to 170D-4 may be optically connected to respective optical receivers 120A-1 to 120A-4 and configured to receive reflected optical signals produced by mirrors 160A to 160D and transmit the reflected optical signal to the respective optical receivers 120A-1 to 120D-4 with the understanding that the letter suffixes A through D refer to corresponding optical receiver chips 120A to 120D and the understanding that the number suffixes -1 through -4 refer to corresponding optical receivers 120A-1 to 120D4.

The plurality of filters 180A to 180D are formed on a board, e.g., a printed circuit board, each filter 180A to 180D configured to apply a weight to a reflected optical signal produced by a mirror of the plurality of mirrors 160A to 160D before the reflected optical signal is transmitted to an optical receiver 120A-1 to 120D-4 by the receiving waveguide 170A-1 to 170D-4 that receives the reflected optical signal. For example, the filter 180A may be configured to apply weights to reflected optical signals produced by the mirror 160A before the reflected optical signals are transmitted to the optical receivers 120A-1 to 120A-4 by the receiving waveguides 170A-1 to 170A-4. Similarly, each of the filters 180B to 180D may be configured to apply weights to reflected optical signals produced by the mirrors 180B to 180D, respectively, before the reflected optical signals are transmitted to the optical receivers 120B-1 to 120B-4, 120C-1 to 120C-4, and 120D-1 to 120D-4, respectively. The plurality of filters 180A to 180D may be formed on the same board on which the inter-node waveguides 130-1 to 130-4 are formed and/or the same board on which the optical transmitter chips 110A to 110D and/or optical receiver chips 120A to 120D are mounted. As used throughout this disclosure, the term "filter" may refer to a plurality of filter elements arranged as a filter array. For example, the filter 180A may include a plurality of filter elements that apply separate weights to optical signals transmitted on each of the receiving waveguides 170A-1, 170A-2, 170A-3, and 170A-4. Similarly, the filter 180B may include a plurality of filter elements that apply separate weights to optical signals transmitted one each of the receiving waveguides 170B-1, 170B-4, 170B-3, and 170B-4.

Each of intra-node signal lines 190A-1 to 190D-4 is connected to an optical receiver of the plurality of optical receivers 120A-1 to 120D-4 and an optical transmitter of the plurality of optical transmitters 110A-1 to 110D-4 and is configured to receive an electrical signal representing a power of an optical signal received by the optical receiver and transmit the electrical signal to the optical transmitter, thereby connecting the optical receiver and the optical transmitter to form an input and an output of a neuron. For example, the intra-node signal 190A-1 may be connected to the optical receiver 120A-1 and the optical transmitter 110A-1 and configured to receive an electrical signal representing a power of an optical signal received by the optical receiver 120A-1 and transmit the electrical signal to the optical transmitter 110A-1, thereby connecting the optical receiver 120A-1 and the optical transmitter 110A-1 to form an input and an output of a neuron. (The various waveguides, including the transmitting waveguides, receiving waveguides, and inter-node waveguides, may thus function as synapses.) In this way, in the specific example illustrated in FIG. 1, each set of transmitter chips 110 and receiver chips 120 having the same letter suffix (e.g., transmitter chip 110A and receiver chip 120A) may comprise two or four neurons depending on whether the optical transmitters 110A-1 to 110D-4 are divided into differential pairs. In the case of differential pairs, for example, the set of transmitter chip 110A and receiver chip 120A may include a first neuron having a variable optical transmitter 110A-1, a reference optical transmitter 110A-2, optical receivers 120A-1 and 120A-2, and intra-node signal lines 190A-1 and 190A-2 and may include a second neuron having a variable optical transmitter 110A-3, a reference optical transmitter 110A-4, optical receivers 120A-3 and 120A-4, and intra-node signal lines 190A-3 and 190A-4. However, the number of neurons in a chip pair can be any number. Furthermore, in some embodiments, optical transmitters and optical receivers can be implemented in a single chip.

In FIG. 1, each of the optical transmitter chips 110A to 110D includes the same number of optical transmitters (e.g., four optical transmitters 110A-1 to 110A-4 for optical transmitter chip 110A) and each of the optical receiver chips 120A to 120D includes the same number of optical receivers (e.g., four optical receivers 120A-1 to 120A-4 for optical receiver chip 120A). Moreover, the number of optical transmitters (e.g., four) included in each of the optical transmitter chips 110A to 110D is the same as the number of optical receivers (e.g., four) included in each of the optical receiver chips 120A to 120D. In this case, the number of inter-node waveguides 130-1 to 130-4 connected to each of the optical transmitter chips via the transmitting waveguides (e.g., four, such as inter-node waveguides 130-1 to 130-4 connected to optical transmitter chip 110A via transmitting waveguides 150A-1 to 150A-4, or inter-node waveguides 130-1 to 130-4 connected to optical transmitter chip 110B via transmitting waveguides 150A-1 to 150A-4) may be the same as the number of optical transmitters included in each of the optical transmitter chips (e.g., four) and the number of optical receivers included in each of the optical receiver chips (e.g., four). By matching the number of inter-node waveguides 130-1 to 130-4 to the numbers of optical transmitters/receivers per chip, each of the inter-node waveguides 130-1 to 130-4 can be dedicated to the same-positioned optical transmitter/receiver of each chip to define a channel, e.g., channels corresponding to the number suffixes -1 to -4. Thus, for example, if the second optical transmitter (e.g., optical transmitter 110A-2 or 110B-2) of each optical transmitter chip (e.g., optical transmitter chip 110A or 110B) emits a reference optical signal of a differential signal as described above, all of the second optical transmitters (e.g., optical transmitters 110A-2, 110B-2, 110A-3, and 110A-2), all of the second optical receivers (e.g., optical receivers 120A-2, 120B-2, 120C-2, and 120D-2), all of the second transmitting waveguides (e.g., transmitting waveguides 150A-2, 150B-2, 150C-2, and 150D-2), all of the second receiving waveguides (e.g., receiving waveguides 170A-2, 170B-2, 170C-2, and 170D-2), and the internode-waveguide 130-2 may define a reference channel for use by a plurality of differential pairs of optical transmitters.

Figure 2:
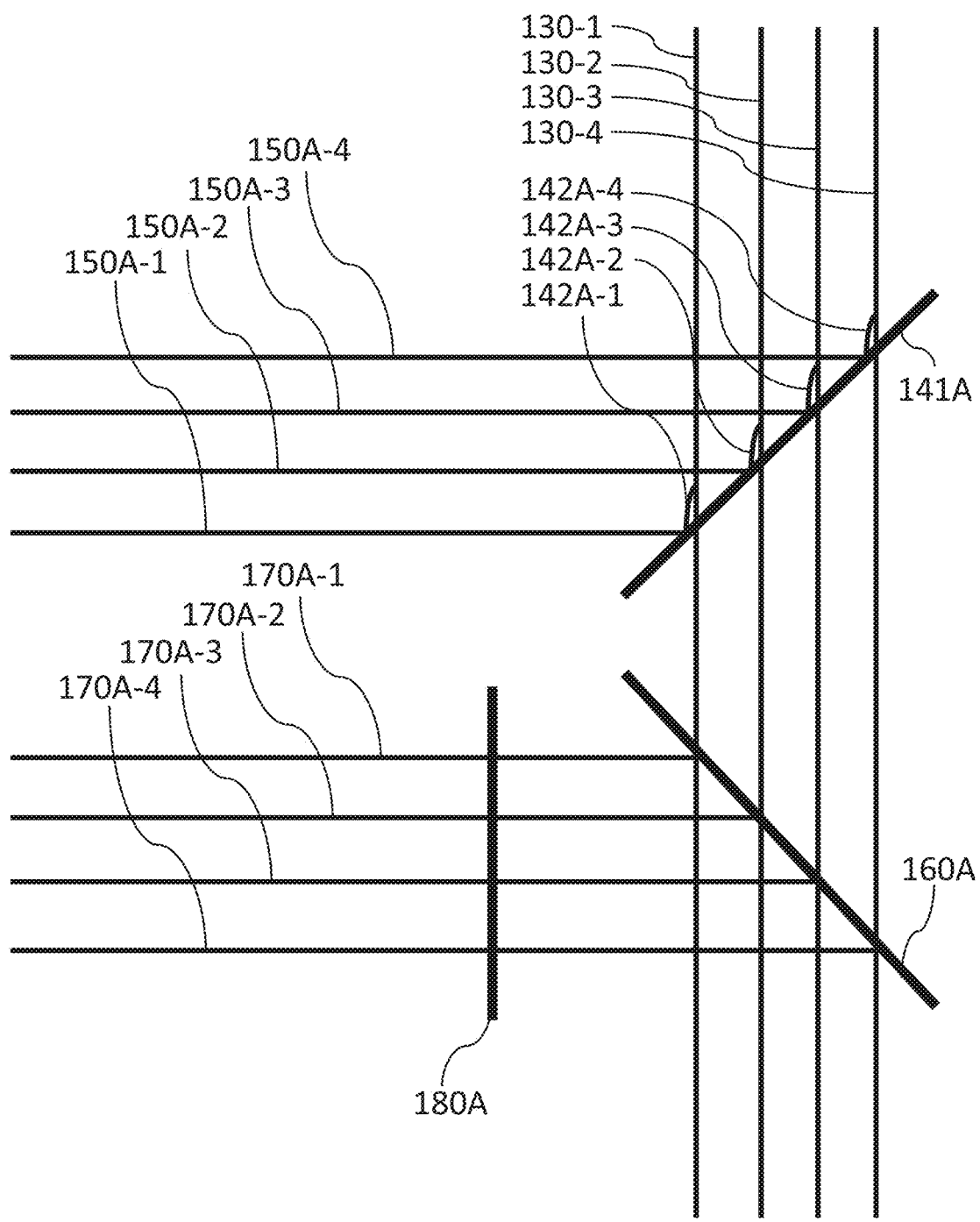
FIG. 2 shows an example schematic of a region of the waveguide architecture shown in FIG. 1.

FIG. 2 shows an example diagram of a region of the waveguide architecture shown in FIG. 1, namely the region indicated by the dashed circle in FIG. 1. As shown in FIG. 2, the multiplexer 140A includes an entrance mirror 141A and a y-shaped waveguide structure 142A-1 connected by a first entrance arm and an exit arm to an inter-node waveguide 130-1 onto which the multiplexer 140A multiplexes its input signal, the entrance mirror 141A configured to receive, as the input signal, an optical signal transmitted by a transmitting waveguide 150A-1 of the plurality of waveguides and reflect the input signal to produce a reflected optical signal that enters a second entrance arm of the y-shaped waveguide structure and joins an optical signal propagating on the inter-node waveguide 130-1 where the second entrance arm meets the first entrance arm of the y-shaped waveguide structure 142A-1. The first entrance arm and the exit arm of the y-shaped waveguide structure 142A-1 may physically be lengths of the inter-node waveguide 130-1, e.g., those lengths before and after the point where the second entrance arm meets the inter-node waveguide 130-1 to form the y-shaped waveguide structure 142A-1. For this reason, only the second entrance arm of the y-shaped waveguide structure 142A-1 is shown as a separate structure from the inter-node waveguide 130-1 in FIG. 2. The entrance mirror 141A may have a reflection coefficient of substantially for light incident on the side facing the transmitting waveguide 150A-1 while having a reflection coefficient of substantially 0 for light incident on the opposite side. In this way, the entrance mirror 141A may reflect the optical signal transmitted by the transmitting waveguide 150A-1 so that the reflected optical signal enters the second entrance arm of the y-shaped waveguide structure 142-1 while allowing optical signals propagating on the inter-node waveguide 130-1 to pass through so as to enter the first entrance arm of the y-shaped waveguide structure 142-1.

The y-shaped waveguide structures 142-2 to 142-4 may have the same functionality with respect to the transmitting waveguides 150-2 to 152-4 and inter-node waveguides 130-2 to 130-4 as the y-shaped waveguide structure 142-1 has with respect to the transmitting waveguide 150-1 and inter-node waveguide 130-1. The multiplexer 140A may refer to the combination of the entrance mirror 141A and each of the y-shaped waveguide structures 142A-1 to 142A-4. Alternatively, the multiplexer 140A may refer to the entrance mirror 141A in combination with a single y-shaped waveguide structure (e.g., 142A-1), such that FIG. 2 shows four multiplexers 140A that share the entrance mirror 141A.

Figure 3:
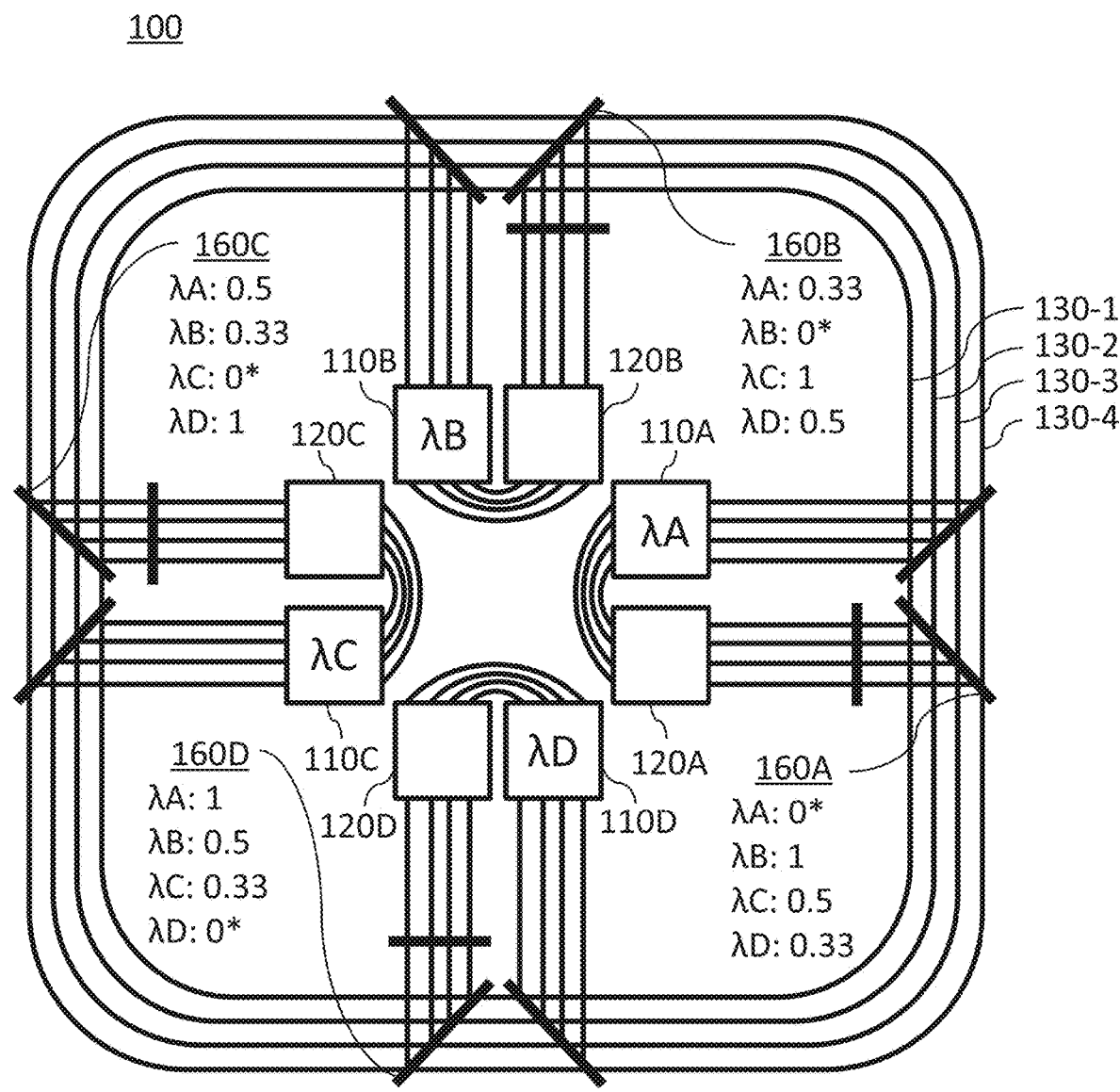
FIG. 3 shows an example schematic of the waveguide architecture shown in FIG. 1 including reflection coefficients of mirrors.

FIG. 3 shows an example diagram of the waveguide architecture shown in FIG. 1 including reflection coefficients of the mirrors 160A to 160D. Due to limited space, only the optical transmitter chips 110A to 110D, optical receiver chips 120A to 120D, inter-node waveguides 130-1 to 130-4, and mirrors 160A to 160D are given reference numbers in FIG. 3 and none of the individual optical transmitters 110A-1 to 110D-4 or optical receivers 120A-1 to 110D-4 are shown. Furthermore, the labels "Tx" and "Rx" for the optical transmitter chips 110A to 110D and optical receiver chips 120A to 120D have been omitted, and in their place each of the optical transmitter chips 110A to 110D is labeled by a corresponding wavelength λA to λD. As indicated by these labels, in the example shown in FIG. 3, the optical transmitter chips 110A to 110D are dedicated to corresponding transmission wavelengths λA to λD, respectively. That is, the optical signals emitted by the plurality of optical transmitter chips 110A-1 to 110A-4 of optical transmitter chip 110A are at the wavelength λA, the optical signals emitted by the plurality of optical transmitter chips 110B-1 to 110B-4 of optical transmitter chip 110B are at the wavelength a, etc. Thus, for example, the optical signals emitted by optical transmitters 110A-1, 110B-1, 110C-1, and 110D-1 are at respective wavelengths λA, λB, λC, and λD, and these four optical signals of different wavelengths are respectively transmitted by transmitting waveguides 150A-1, 150B-1, 150C-1, and 150D-1 and multiplexed onto the inner-most inter-node waveguide 130-1 by respective multiplexers 140A, 140B, 140C, and 140D using, e.g., wavelength division multiplexing (WDM). Similarly, the optical signals emitted by optical transmitters 110A-2, 110B-2, 110C-2, and 110D-2 are at respective wavelengths λA, λB, λC, and λD, and these four optical signals of different wavelengths may be respectively transmitted by transmitting waveguides 150A-2, 150B-2, 150C-2, and 150D-2 and multiplexed onto the next inter-node waveguide 130-2 by respective multiplexers 140A, 140B, 140C, and 140D using, e.g., wavelength division multiplexing (WDM). The third and fourth channels may function correspondingly. Thus, optical signals of four wavelengths λA, λB, λC, and λD may propagate on each of the four inter-node waveguides 130-1 to 130-4.

In the example shown in FIG. 3, the mirrors 160A to 160D are configured such that the optical receiver chips 120A to 120D of each chip pair (each pair of optical receiver chip and optical transmitting chip) receives all of the optical signals emitted by the optical transmitter chips of the other chip pairs. For example, the mirror 160A is configured such that the optical receiver chip 120A receives all of the optical signals emitted by the optical transmitter chips 120B, 120C, and 120D. Specifically, as shown by way of example in FIG. 3, the reflection coefficient of the mirror 160A may depend on wavelength. For example, a bragg filter or combination of bragg filters having different transparencies for different wavelengths may be used as any of the mirrors 160A to 160D. With the waveguide architecture shown in FIG. 3, the optical signals propagating on the inter-node waveguides 130-1 to 130-4 are traveling counterclockwise. Thus, when the optical signals emitted by the optical transmitter chip 110D reach the mirror 160A to be reflected to the optical receiver chip 120A, the optical signals have yet to arrive at mirrors 160B and 160C to be reflected to the optical receiver chips 120B and 120C and must be allowed to transmit through the mirror 160A accordingly. When the optical signals emitted by the optical transmitter chip 110C arrive at the optical receiver 120A, the optical signals have yet to arrive at mirror 160B and must be allowed to transmit through the mirror 160A accordingly. When the optical signals emitted by the optical transmitter chip 110C arrive at the optical receiver 120A, the optical signals do not need to go further (in the case where they do not need to be received by the optical receiver chip 110C of the same chip pair as the optical transmitter chip 110C).

On the basis of these principles, the mirrors 160A to 160D may be configured as shown in FIG. 3, such that (using mirror 160A as a representative example) the reflection coefficient for the wavelength λD is about 0.33 or one-third, allowing for the optical signal emitted from the optical transmitter chip 110D to still be received by two optical receiver chips 120B and 120C, the reflection coefficient for the wavelength λC is about 0.5, allowing for one-half of the remaining two-thirds of the optical signal emitted from the optical transmitter chip 110C to still be received by one optical receiver chip 120B (the first one-third having been reflected by the mirror 160D), and the reflection coefficient for the wavelength λB is about 1, e.g., the remainder of the optical signal emitted from the optical transmitter chip 110C (after the first two-thirds have been reflected by the mirrors 160C and 160D). As for the reflection coefficient for the wavelength λA, it is indicated in FIG. 3 as 0* because it may be zero in some embodiments, allowing for no reflection by the mirror 160A of the remaining optical signal emitted from the optical transmitter chip 110A, or it may be any arbitrary value under the assumption that no such λA optical signal remains after having been reflected by the mirrors 160B, 160C, an 160D. The mirrors 160B, 160C, and 160D may be configured correspondingly, as shown in FIG. 3. Thus, for each of the optical receivers 120A-1 to 120D-4 that is connected to an optical transmitter 110A-1 to 110D-4 via an intra-node signal line 190A-1 to 190D-4, the plurality of mirrors 160A to 160D includes a mirror whose reflected optical signal is transmitted to the optical receiver and whose reflection coefficient is substantially zero for a wavelength of the optical signal emitted by the optical transmitter. With these reflection coefficients λA to λD, each optical signal from each optical transmitter may be substantially reflected and divided into a plurality of optical signals having substantially the same power (e.g., ⅓ of the transmitted optical signal in this embodiment without considering optical loss through waveguides) and each divided optical signal may be propagated through a corresponding receiving waveguide.

Figure 4:
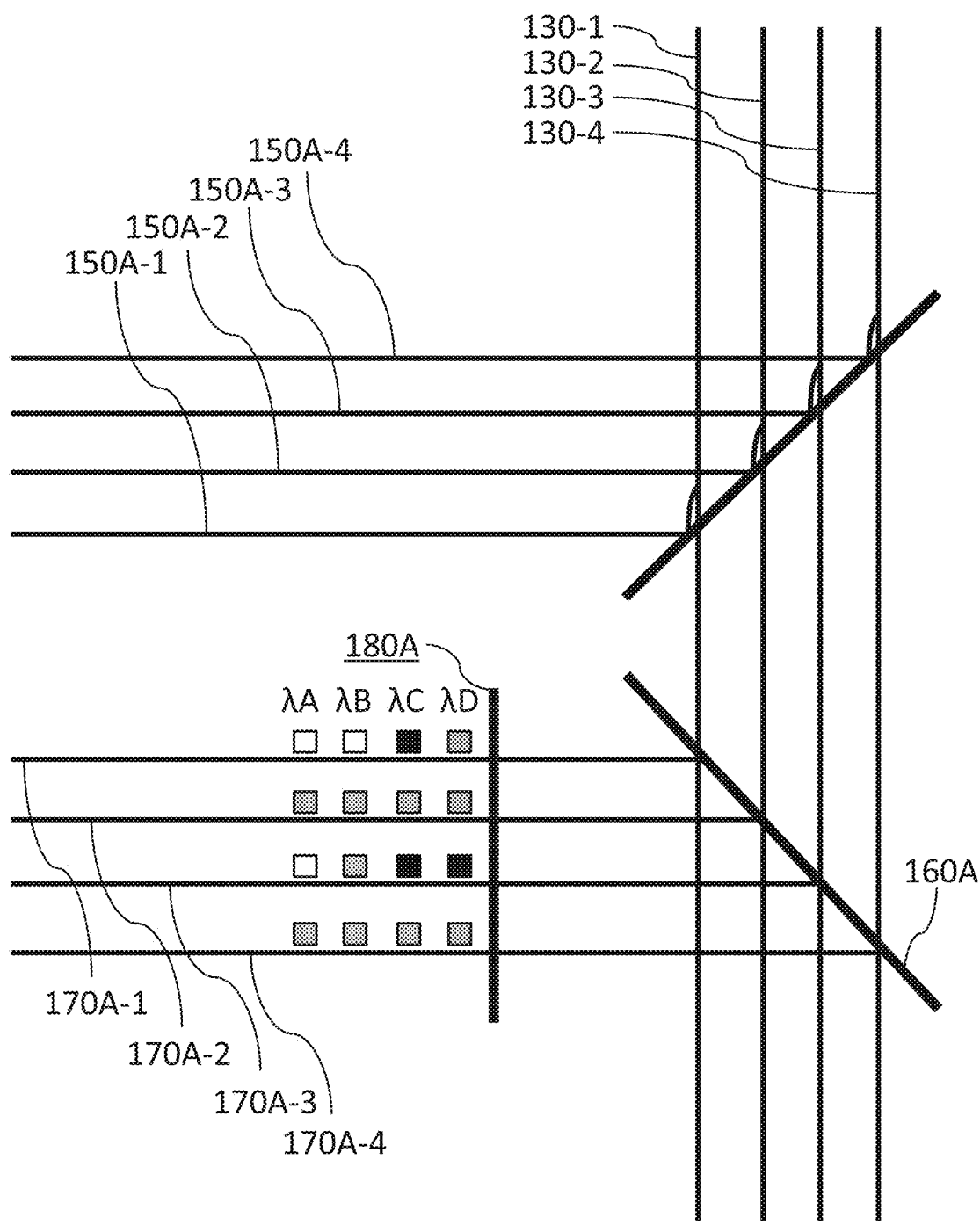
FIG. 4 shows an example schematic of the region of the waveguide architecture shown in FIG. 2 including arbitrary weights of a filter.

FIG. 4 shows an example diagram of the region of the waveguide architecture shown in FIG. 2 including arbitrary weights of the filter 180A. Due to limited space and for simplicity, only the inter-node waveguides 130-1 to 130-4, transmitting waveguides 150A-1 to 150A-4, mirror 160A, receiving waveguides 170A-1 to 170A-4, and filter 180A are given reference numbers in FIG. 4. In the example of FIG. 4, the filter 180A is a spectral filter whose applied weight depends on wavelength. The example of FIG. 4 uses the same convention regarding wavelengths as FIG. 3. That is, the wavelengths λA, λB, λC, and λD are the wavelengths of the optical signals emitted by the optical transmitter chips 110A, 110B, 110C, and 110D, respectively. As further described by way of example with respect to FIG. 3, such optical signals of four wavelengths may propagate on each of the inter-node waveguides 130-1, 130-2, 130-3, and 130-4 and may be reflected by the mirror 160A such that reflected optical signals of each of the four wavelengths (or three out of four, depending on the configuration of the mirrors 160A to 160D) is transmitted by each receiving waveguide 170A-1, 170A-2, 170A-3, and 170A-4 to the optical receiver chip 120A. By using a spectral filter as the filter 180A, the optical signal of each wavelength may be weighted differently. It should also be noted that the weighting scheme may be different for each of the receiving waveguides 170A-1, 170A-2, 170A-3, and 170A-4, since the filter may be a filter array including multiple filter elements as described above.

In the specific example shown in FIG. 4, arbitrary weights are depicted for each wavelength for each of the receiving waveguides 170A-1, 170A-2, 170A-3, and 170A-4. For simplicity, three shades are used: white representing relatively "transparent" filtering, e.g., a high weight, black representing relatively "opaque" filtering, e.g., a low weight, and gray representing filtering with a mid-level weight. However, any number of weight gradations may be possible. In the example of FIG. 4, the second and fourth channels, e.g., the channels including receiving waveguides 170A-2 and 170A-4 are for reference optical signals of differential pairs, and thus they are given the mid-level weight (gray) for all wavelengths in this example. The weights depicted for the first and third channels, e.g., the channels including receiving waveguides 170A-1 and 170A-3, are intended to represent any arbitrary distribution of weights. In this way, the filter 180A may separately weight the optical signals emitted by each of the optical transmitters 110A-1 to 110D-4. Similarly, the filters 180B, 180C, and 180D may separately weight the optical signals emitted by each of the optical transmitters 110A-1 to 110D-4, either by using identical or different weight distributions. In some embodiments, the filter 180A need not apply any weight (or may apply a zero weight) to optical signals having the wavelength λA because the mirrors 160A to 160D may be configured to prevent the receiving waveguides 170A-1 to 170A-4 from receiving optical signals having the wavelength λA (such optical signals having been emitted by the optical transmitter chip 110A of the same chip pair). The same may be correspondingly true for the other filters 180B to 180D.

In some embodiments, it may be possible to change the weights of the filters 180A to 180D. For example, the filters 180A to 180D may include one or more exchangeable filters that can be exchanged, e.g., physically removed and replaced, to change the applied weight(s). This replacement can be done by manual operation of a user. Instead, a manipulator or a mechanism controlled by a controller or a computer connected to or included in the photonic neural component 100 may change each filter 180A to 180D or the individual filter elements on each receiving waveguide 170A-1 to 170D-4. As another example, the filters 180A to 180D may include one or more variable filters whose transparency can be varied to change the applied weights(s). Varying the transparency may be accomplished in various ways, e.g., using liquid crystal filters whose transparency can be changed by changing the driving voltage, using optical attenuators to change the power of the light, dividing an optical signal into several sub-waveguides and selectively turning ON and OFF optical switches to allow only a portion of the sub-waveguides to propagate the optical signal. Such configurations for varying of the transparency to adjust the weight may be employed after splitting the optical signals on each of the receiving waveguides 170A-1 to 170A-4 into the respective wavelengths λA, λB, λC, and λD. As a result, optical receiver 120D-1, as an example, may receive optical signals having a total power of $P_{RxD-1}=⅓\ (W_{λAD-1}\ T_{TxA-1} + W_{λBD-1}\ T_{TxB-1} + W_{λCD-1}\ T_{TxC-1})$ without considering power loss through waveguides, where $T_{TxA-1}$, $T_{TxB-1}$, and $T_{TxC-1}$ represent powers of the emitted optical signals from optical transmitters 110A-1, 110B-1, and 110C-1 respectively, $W_{λAD-1}$, $W_{λBD-1}$, and $W_{λCD-1}$ are weights based on the transparency coefficients of filter 180A for receiving waveguide 170D-1 at wavelengths λA, λB, and λC respectively, a differential pair of optical receiver 120D-1 and 120D-2 receive differential optical signals having powers of $P_{RxD-1}$ and $P_{RxD-2}$, and a received value is calculated based on the difference of these powers (e.g., $P_{RxD1\&2}=P_{RxD-1}-P_{RxD-2}$). A set of a differential pair of optical receivers (e.g., 120D-1 and 120D-2) and a corresponding differential pair of optical transmitters (e.g., 110D-1 and 110D-2) may be included in each neuron, and the output of the neuron may be calculated by applying a neural output function f(x) such as a sigmoid function to a received value or an Integrate and Fire spiking model. For example, the value of the output signal, represented by the difference of optical powers output from the differential pair of optical transmitters 110D-1 and 110D-2, may be determined (e.g., proportionally determined) based on $f(P_{RxD1\&2})$.

Figure 5:
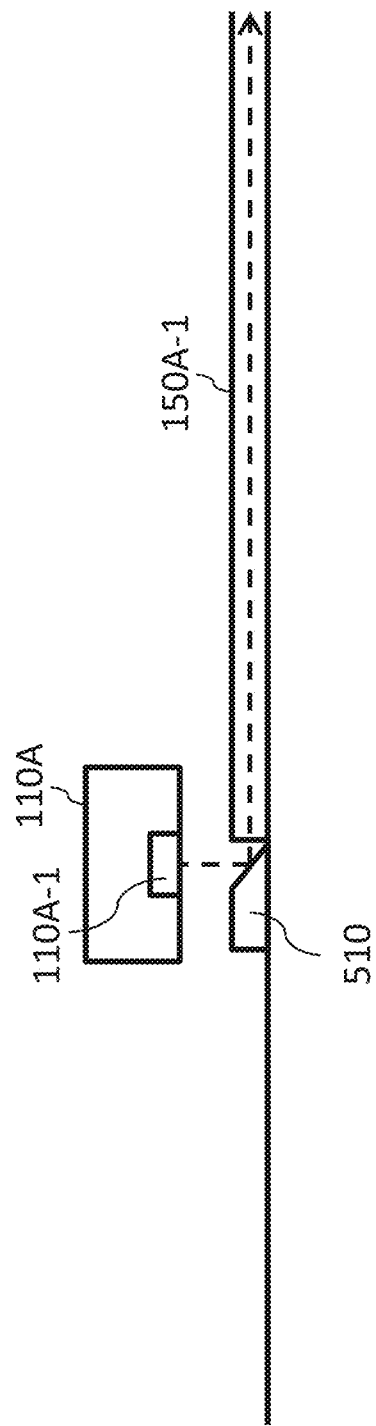
FIG. 5 shows an example schematic side view of a portion of a board on which a transmitter chip and a transmitting waveguide are formed.

FIG. 5 shows an example diagram side view of a portion of a board on which the transmitter chip 110A and the transmitting waveguide 150A-1 are formed. In the example shown in FIG. 5, the board on which the transmitting waveguide 150A-1 is formed is the same board on which the optical transmitter chip 110A is mounted. As shown in FIG. 5, the transmitting waveguide 150A-1 is formed on a surface of the board (represented by the horizontal surface on which the transmitting waveguide 150A-1 is formed), along with an entrance mirror 510 configured to redirect light from a direction perpendicular to the board to a direction parallel to the board, e.g., at a substantially 45° angle with respect to the board. The optical transmitter chip 110A, including the optical transmitter 110A-1, is mounted on the board with the optical transmitter 110A-1 facing the board, e.g., by flip chip bonding. The dashed line schematically represents an optical signal emitted by the optical transmitter 110A-1.

Figure 6:
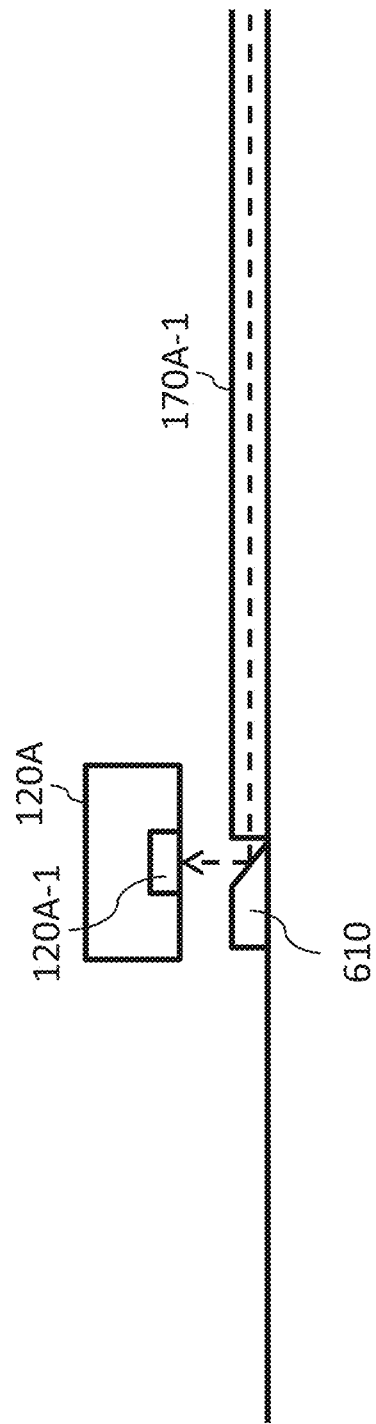
FIG. 6 shows an example schematic side view of a portion of a board on which a receiver chip and a receiving waveguide are formed.

FIG. 6 shows an example diagram side view of a portion of a board on which the receiver chip 120A and the receiving waveguide 170A-1 are formed. In the example of FIG. 6, the board on which the receiving waveguide 170A-1 is formed is the same board on which the optical receiver chip 170A is mounted. As shown in FIG. 6, the receiving waveguide 170A-1 is formed on a surface of the board (represented by the horizontal surface on which the transmitting waveguide 170A-1 is formed), along with an exit mirror 610 configured to redirect light from a direction parallel to the board to a direction perpendicular to the board, e.g., at a substantially 45° angle with respect to the board. The optical receiver chip 120A, including the optical receiver 120A-1, is mounted on the board with the optical receiver 120A-1 facing the board, e.g., by flip chip bonding. The dashed line schematically represents an optical signal received by the optical receiver 120A-1.

The configuration described with respect to FIG. 5 may also apply to the remainder of the transmitting waveguides 150A-2 to 150A-4 connected to the optical transmitter chip 110A, and the configuration described with respect to FIG. 6 may also apply to the remainder of the receiving waveguides 170A-2 to 170A-4 connected to the optical receiver chip 120A. Moreover, the configurations described with respect to FIGS. 5 and 6 may apply correspondingly to the transmitting waveguides 150B-1 to 150D-4 and optical transmitter chips 110B to 110D and to the receiving waveguides 170B-1 to 170D-4 and optical receiver chips 120B to 120D. Thus, each of the optical transmitter chips 110A to 110D and optical receiver chips 120A to 120D may be arranged such that at least one optical transmitter included in the chip (e.g., optical transmitter 110A-1) or at least one optical receiver included in the chip (e.g., optical receiver 120A-1) faces the board, with the transmitting waveguides 150A-1 to 150D-4 connected to the optical transmitters 110A-1 to 110D-4 via the entry mirrors 510 and the receiving waveguides 170A-1 to 170D-4 connected to the optical receivers 120A-1 to 120D-4 via the exit mirrors 610.

The various waveguides and the multiplexers 140A to 140D of the photonic neural component 100 may be manufactured by forming a lower clad layer in a layer of a board, forming a core layer on the lower clad layer, and forming an upper clad layer on the core layer. The lower and upper clad layers may be formed, for example, by applying a first polymer using spin coating or curtain coating and baking.

The lower and upper clad layers may be shared by multiple parallel waveguides. The core layer may be formed, for example, by applying a second or the same polymer using spin coating or curtain coating and baking, wherein a photomask pattern having an opening in a portion to be the core is formed on the second polymer and irradiated with ultraviolet rays to increase the refractive index. The mirrors 160A to 160D, entry mirrors 510, and exit mirrors 560, may be formed during the formation of the waveguides, e.g., by cutting an end portion of the core and forming a reflective surface by vapor deposition of mirror material such as aluminum, silver, etc. or a total internal reflection mechanism may be used.

Figure 7:
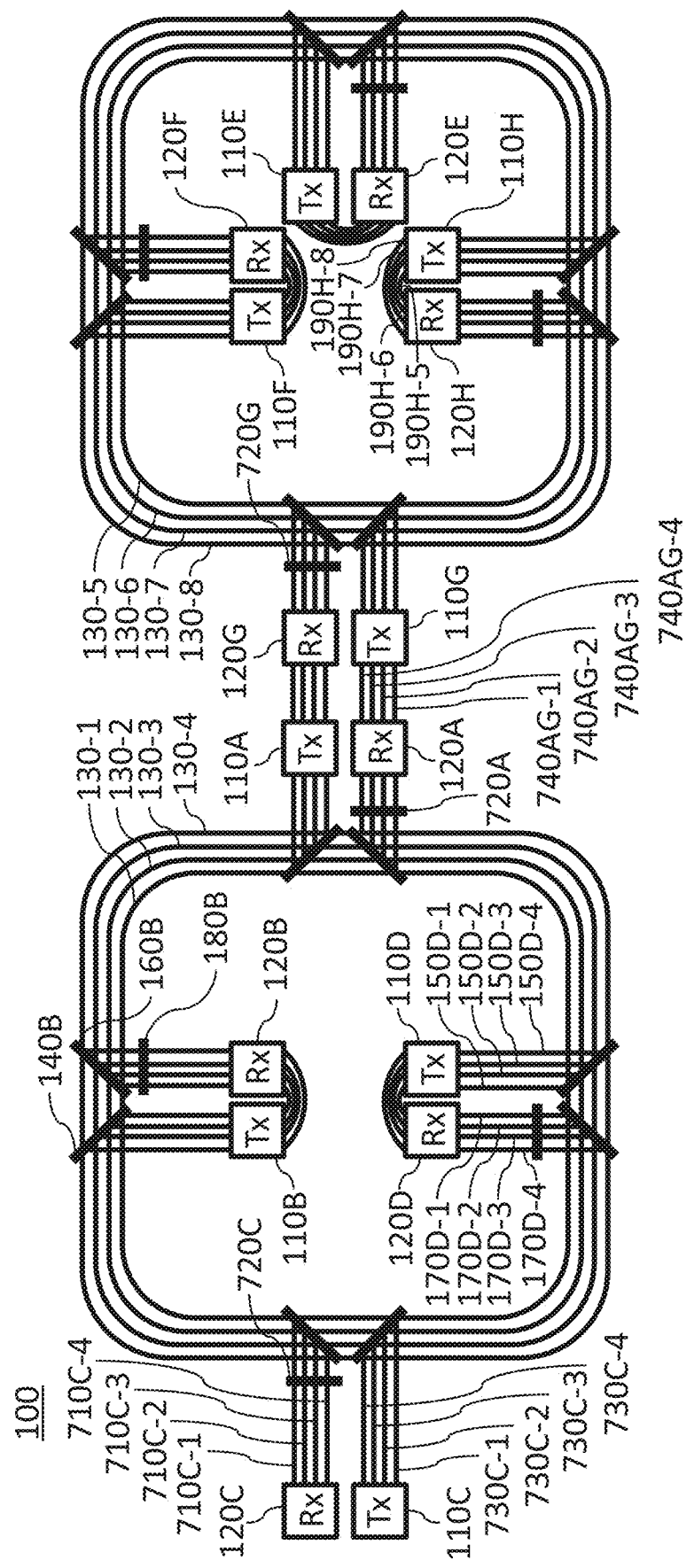
FIG. 7 shows an example schematic of a waveguide architecture for a photonic neural component according to an embodiment of the present invention.

FIG. 7 shows an example diagram of a waveguide architecture for a photonic neural component 100 according to an embodiment of the invention. The architecture of FIG. 7 is an example of how the architecture of FIG. 1 may be expanded to include more pairs of transmitter and receiver chips, e.g., more neurons. Due to limited space, out of the plurality of transmitting waveguides 150B-1 to 150B-4, 150D-1 to 150D-4, 150E-5 to 150E-8, 150E-5 to 150E-8, and 150H-5 to 150H-8, only transmitting waveguides 150D-1 to 150D-4 are given reference numbers in FIG. 7. Similarly, out of the plurality of multiplexers 140A to 140H only multiplexer 140B is given a reference number in FIG. 7, out of the plurality of mirrors 160A to 160H only mirror 160B is given a reference number in FIG. 7, out of the plurality of filters 180B, 180D, 180E, 180F, and 180H only filter 180B is given a reference number in FIG. 7, out of the plurality of receiving waveguides 170B-1 to 170B-4, 170D-1 to 170D-4, 170E-5 to 170E-8, 170E-5 to 170E-8, and 170H-5 to 170H-8 only receiving waveguides 170D-1 to 170D-4 are given reference numbers in FIG. 7, and out of the plurality of intra-node signal lines 190B-1 to 190B-4, 190D-1 to 190D-4, 190E-5 to 190E-8, 190E-5 to 190E-8, and 190H-5 to 190H-8 only intra-node signal lines 190H-5 to 190H-8 are given reference numbers in FIG. 7. Nevertheless, the omitted reference numbers of transmitting waveguides, multiplexers, mirrors, receiving waveguides, filters, and intra-node signal lines depicted in FIG. 7 may be referred to throughout this disclosure with the understanding that the letter suffixes A through H refer to corresponding optical transmitter chips 110A to 110H and optical receiver chips 120H to 120H and the understanding that the number suffixes -1 through -8 refer to corresponding inter-node waveguides 130-1 to 130-8.

Just as the optical transmitter chips 110A to 110D of FIG. 1 include respective pluralities of optical transmitters 110A-1 to 110A-4, 110B-1 to 110B-4, 110C-1 to 110C-4, and 110D-1 to 110D-4, the optical transmitter chips 110A to 110H of FIG. 7 include respective pluralities of optical transmitters 110A-1 to 110A-4, 110B-1 to 110B-4, 110C-1 to 110C-4, 110D-1 to 110D-4, 110E-5 to 110E-8, 110E-5 to 110E-8, 110G-5 to 110G-8, and 110H-5 to 110H-8, but for ease of illustration none of the optical transmitters are shown in FIG. 7. In the same way, just as the optical receiver chips 120A to 120D of FIG. 1 include respective pluralities of optical receivers 120A-1 to 120A-4, 120B-1 to 120B-4, 120C-1 to 120C-4, and 120D-1 to 120D-4, the optical receiver chips 120A to 120H of FIG. 7 include respective pluralities of optical receivers 120A-1 to 120A-4, 120B-1 to 120B-4, 120C-1 to 120C-4, 120D-1 to 120D-4, 120E-5 to 110E-8, 120E-5 to 120E-8, 120G-5 to 120G-8, and 120H-5 to 120H-8, but for ease of illustration none of the optical receivers are shown in FIG. 7.

In the example of FIG. 1, the plurality of inter-node waveguides 130-1 to 130-4 includes a first ring (e.g., inter-node waveguides 130-1 to 130-4) having two or more of the inter-node waveguides arranged as concentric loops, the plurality of optical transmitters 110A-1 to 110D-4 includes a first inner optical transmitter group (e.g., optical transmitters 110A-1 to 110D-4) having two or more of the optical transmitters disposed inside the first ring, and the plurality of optical receivers 120A-1 to 120D-4 includes a first inner optical receiver group (e.g., optical receivers 120A-1 to 120D-4) having two or more of the optical receivers disposed inside the first ring. In the example of FIG. 7, similarly to FIG. 1, the plurality of inter-node waveguides 130-1 to 130-8 includes a first ring (e.g., inter-node waveguides 130-1 to 130-4) having two or more of the inter-node waveguides arranged as concentric loops, the plurality of optical transmitters 110A-1 to 110A-4, 110B-1 to 110B-4, 110C-1 to 110C-4, 110D-1 to 110D-4, 110E-5 to 110E-8, 110E-5 to 110E-8, 110G-5 to 110G-8, and 110H-5 to 110H-8 includes a first inner optical transmitter group (e.g., optical transmitters 110B-1 to 110B-4 and 110D-1 to 110D-4) having two or more of the optical transmitters disposed inside the first ring, and the plurality of optical receivers 120A-1 to 120A-4, 120B-1 to 120B-4, 120C-1 to 120C-4, 120D-1 to 120D-4, 120E-5 to 110E-8, 120E-5 to 120E-8, 120G-5 to 120G-8, and 120H-5 to 120H-8 includes a first inner optical receiver group (e.g., optical receivers 120B-1 to 120B-4 and 120D-1 to 120D-4) having two or more of the optical receivers disposed inside the first ring. The plurality of optical transmitters 110A-1 to 110A-4, 110B-1 to 110B-4, 110C-1 to 110C-4, 110D-1 to 110D-4, 110E-5 to 110E-8, 110E-5 to 110E-8, 110G-5 to 110G-8, and 110H-5 to 110H-8 may further include a first outer optical transmitter group (e.g., optical transmitters 110A-1 to 110A-4 and 110C-1 to 110C-4) having two or more of the optical transmitters disposed outside the first ring, and the plurality of optical receivers 120A-1 to 120A-4, 120B-1 to 120B-4, 120C-1 to 120C-4, 120D-1 to 120D-4, 120E-5 to 110E-8, 120E-5 to 120E-8, 120G-5 to 120G-8, and 120H-5 to 120H-8 may further include a first outer optical receiver group (e.g., optical receivers 120A-1 to 120A-4 and 120C-1 to 120C-4) having two or more of the optical receivers disposed outside the first ring.

As shown in FIG. 7, the plurality of inter-node waveguides 130-1 to 130-8 may further include a second ring (e.g., inter-node waveguides 130-5 to 130-8) having two or more of the inter-node waveguides arranged as concentric loops, the plurality of optical transmitters 110A-1 to 110A-4, 110B-1 to 110B-4, 110C-1 to 110C-4, 110D-1 to 110D-4, 110E-5 to 110E-8, 110E-5 to 110E-8, 110G-5 to 110G-8, and 110H-5 to 110H-8 includes a second inner optical transmitter group (e.g., 110E-5 to 110E-8, 110E-5 to 110E-8, and 110H-5, to 110H-8) having two or more of the optical transmitters disposed inside the second ring, and the plurality of optical receivers 120A-1 to 120A-4, 120B-1 to 120B-4, 120C-1 to 120C-4, 120D-1 to 120D-4, 120E-5 to 120E-8, 120E-5 to 120E-8, 120G-5 to 120G-8, and 120H-5 to 120H-8 includes a second inner optical receiver group (e.g., 120E-5 to 120E-8, 120E-5 to 120E-8, and 120H-5, to 120H-8) having two or more of the optical receivers disposed inside the second ring. The plurality of optical transmitters 110A-1 to 110A-4, 110B-1 to 110B-4, 110C-1 to 110C-4, 110D-1 to 110D-4, 110E-5 to 110E-8, 110E-5 to 110E-8, 110G-5 to 110G-8, and 110H-5 to 110H-8 may further include a second outer optical transmitter group (e.g., optical transmitters 110G-5 to 110G-8) having two or more of the optical transmitters disposed outside the second ring, and the plurality of optical receivers 120A-1 to 120A-4, 120B-1 to 120B-4, 120C-1 to 120C-4, 120D-1 to 120D-4, 120E-5 to 110E-8, 120E-5 to 120E-8, 120G-5 to 120G-8, and 120H-5 to 120H-8 may further include a second outer optical receiver group (e.g., optical receivers 120G-5 to 120G-8) having two or more of the optical receivers disposed outside the second ring.

As described above, the plurality of inter-node waveguides 130-1 to 130-8 may be divided into multiple rings (e.g., the first ring including inter-node waveguides 130-1 to 130-4 and the second ring including inter-node waveguides 130-5 to 130-8), while the optical transmitters and optical receivers (and equally the optical transmitter chips and optical receiver chips) can be divided into inner and outer groups associated with each ring. In the same way, the plurality of multiplexers 140A to 140H may include a first multiplexer group (e.g., multiplexers 140A to 140D), each multiplexer of the first multiplexer group configured to multiplex an input optical signal onto an inter-node waveguide of the first ring (e.g., inter-node waveguides 130-1 to 130-4), and a second multiplexer group (e.g., multiplexers 140E to 140H), each multiplexer of the second multiplexer group configured to multiplex an input optical signal onto an inter-node waveguide of the second ring (e.g., inter-node waveguides 130-5 to 130-8). Likewise, the plurality of mirrors 160A to 160H may include a first mirror group (e.g., mirrors 160A to 160D), each mirror of the first mirror group configured to partially reflect an optical signal propagating on an inter-node waveguide of the first ring (e.g., inter-node waveguides 130-1 to 130-4) to produce a reflected optical signal, and a second mirror group (e.g., mirrors 160E to 160H), each mirror of the second mirror group configured to partially reflect an optical signal propagating on an inter-node waveguide of the second ring (e.g., inter-node waveguides 130-5 to 130-8) to produce a reflected optical signal. The filters 180B, 180D, 180E, 180F, and 180H and the intra-node signal lines 190B-1 to 190B-4, 190D-1 to 190D-4, 190E-5 to 190E-8, 190E-5 to 190E-8, and 190H-5 to 190H-8 may similarly be divided into groups associated with each ring.

In place of receiving waveguides 170A-1 to 170A-4, 170C-1 to 170C-4, and 170G-5 to 170G-8, the waveguide architecture of FIG. 7 instead includes output waveguides 710A-1 to 710A-4, 710C-1 to 710C-4, and 710G-5 to 710G-8, divided into first output waveguides 710A-1 to 710A-4 and 710C-1 to 710C-4 associated with the first ring and second output waveguides 710G-5 to 710G-8 associated with the second ring. (Due to limited space, only output waveguides 710C-1 to 710C-4 are given reference numbers in FIG. 7.) The first output waveguides 710A-1 to 710A-4 and 710C-1 to 710C-4 may be formed on the board such that at least one of the first output waveguides (e.g., first output waveguide 710C-3) crosses at least one of the inter-node waveguides of the first ring (e.g., inter-node waveguide 130-4) with a core of one of the crossing waveguides passing through a core or a clad of the other. Each first output waveguide (e.g., 710C-3) may be connected to outside the first ring and configured to receive a reflected optical signal produced by a mirror of the first mirror group (e.g., mirror 160C) and transmit the reflected optical signal to outside the first ring. Similarly, the second output waveguides 710G-5 to 710G-8 may be formed on the board such that at least one of the second output waveguides (e.g., second output waveguide 710G-7) crosses at least one of the inter-node waveguides of the second ring (e.g., inter-node waveguide 130-8) with a core of one of the crossing waveguides passing through a core or a clad of the other. Each second output waveguide (e.g., 710G-7) may be connected to outside the second ring and configured to receive a reflected optical signal produced by a mirror of the second mirror group (e.g., mirror 160G) and transmit the reflected optical signal to outside the second ring.

In place of filters 180A, 180C, and 180G, the waveguide architecture of FIG. 7 instead includes output filters 720A, 720C, and 720G, divided into first output filters 720A and 720C associated with the first ring and a second output waveguide 720G associated with the second ring. The first output filter 720A is formed on the board and configured to apply a weight to a reflected optical signal produced by a mirror 160A of the plurality of mirrors before the reflected optical signal is transmitted to outside the first ring by the first output waveguide (e.g., first output waveguide 710A-1, 710A-2, 710A-3, or 710A-4) that receives the reflected optical signal. Similarly, the first output filter 720C is formed on the board and configured to apply a weight to a reflected optical signal produced by a mirror 160C of the plurality of mirrors before the reflected optical signal is transmitted to outside the first ring by the first output waveguide (e.g., first output waveguide 710C-1, 710C-2, 710C-3, or 710C-4) that receives the reflected optical signal. Correspondingly, the second output filter 720G is formed on the board and configured to apply a weight to a reflected optical signal produced by a mirror 160G of the plurality of mirrors before the reflected optical signal is transmitted to outside the second ring by the first output waveguide (e.g., first output waveguide 710G-5, 710G-6, 710G-7, or 710G-8) that receives the reflected optical signal.

Each of the optical receivers of the first outer optical receiver group (e.g., optical receivers 120A-1 to 120A-4 and 120C-1 to 120C-4) may be optically connected to a first output waveguide of the plurality of first output waveguides (e.g., 710A-1 to 710A-4 and 710C-1 to 710C-4) and configured to receive the reflected optical signal transmitted by the first output waveguide. Similarly, each of the optical receivers of the second outer optical receiver group (e.g., optical receivers 120G-5 to 120G-8) may be optically connected to a second output waveguide of the plurality of second output waveguides (e.g., second output waveguides 710G-5 to 710G-8) and configured to receive the reflected optical signal transmitted by the second output waveguide. That is, each second output waveguide (e.g., second output waveguide 710G-5, 710G-6, 710G-7, or 710G-8) may be optically connected to an optical receiver of the second outer optical receiver group (e.g., optical receiver 120G-5, 120G-6, 120G-7, or 120G-8) and configured to receive a reflected optical signal produced by a mirror of the second mirror group (e.g., mirror 160G) and transmit the reflected optical signal to the optical receiver. In some embodiments, one or more optical receivers of the first outer optical receiver group (e.g., optical receivers 120A-1 to 120A-4 and 120C-1 to 120C-4) or the second outer optical receiver group (e.g., optical receivers 120G-5 to 120G-8) may serve in this way as an output of a neural network including the photonic neural component 100. For example, in a case where the waveguide architecture shown in FIG. 7 represents a photonic neural component 100 that is a complete neural network, the optical receiver chip 120C may server as an output of the neural network.

In place of transmitting waveguides 150A-1 to 150A-4, 150C-1 to 150C-4, and 150G-5 to 150G-8, the waveguide architecture of FIG. 7 instead includes input waveguides 730A-1 to 730A-4, 730C-1 to 730C-4, and 730G-5 to 730G-8, divided into first input waveguides 730A-1 to 730A-4 and 730C-1 to 730C-4 associated with the first ring and second input waveguides 730G-5 to 730G-8 associated with the second ring. (Due to limited space, only input waveguides 730C-1 to 730C-4 are given reference numbers in FIG. 7.) The first input waveguides 730A-1 to 730A-4 and 730C-1 to 730C-4 may be formed on the board such that at least one of the first input waveguides (e.g., first input waveguide 730C-3) crosses at least one of the inter-node waveguides of the first ring (e.g., inter-node waveguide 130-4) with a core of one of the crossing waveguides passing through a core or a clad of the other. Each first input waveguide (e.g., 730C-3) may be connected to outside the first ring and configured to receive an optical signal from outside the first ring and transmit the received optical signal to an inter-node waveguide of the first ring (e.g., 130-3) via a multiplexer of the first multiplexer group (e.g., multiplexer 140C). Similarly, the second input waveguides 730G-5 to 730G-8 may be formed on the board such that at least one of the second input waveguides (e.g., second input waveguide 730G-7) crosses at least one of the inter-node waveguides of the second ring (e.g., inter-node waveguide 130-8) with a core of one of the crossing waveguides passing through a core or a clad of the other. Each second input waveguide (e.g., 730G-7) may be connected to outside the second ring and configured to receive an optical signal from outside the second ring and transmit the received optical signal to an inter-node waveguide of the second ring (e.g., 130-7) via a multiplexer of the second multiplexer group (e.g., multiplexer 140G).

Each of the optical transmitters of the first outer optical transmitter group (e.g., optical transmitters 110A-1 to 110A-4 and 110C-1 to 110C-4) may be optically connected to a first input waveguide of the plurality of first input waveguides (e.g., 730A-1 to 730A-4 and 730C-1 to 730C-4) and configured to emit an optical signal to be transmitted by the first input waveguide. Similarly, each of the optical transmitters of the second outer optical transmitter group (e.g., optical transmitters 110G-5 to 110G-8) may be optically connected to a second input waveguide of the plurality of second input waveguides (e.g., second input waveguides 730G-5 to 730G-8) and configured to emit an optical signal to be transmitted by the first input waveguide. That is, each second input waveguide (e.g., second input waveguide 730G-5, 730G-6, 730G-7, or 730G-8) may be optically connected to an optical transmitter of the second outer optical transmitter group (e.g., optical transmitter 110G-5, 110G-6, 110G-7, or 110G-8) and configured to receive an optical signal emitted from the optical transmitter and transmit the received optical signal to an inter-node waveguide of the second ring (e.g., inter-node waveguide 130-5, 130-6, 130-7, or 130-8) via a multiplexer of the second multiplexer group (e.g., multiplexer 140G). In some embodiments, one or more optical transmitters of the first outer optical transmitter group (e.g., optical transmitters 110A-1 to 110A-4 and 110C-1 to 110C-4) or the second outer optical transmitter group (e.g., optical transmitters 110G-5 to 110G-8) may serve in this way as an input of a neural network including the photonic neural component 100. For example, in a case where the waveguide architecture shown in FIG. 7 represents a photonic neural component 100 that is a complete neural network, the optical transmitter chip 110C may server as an input of the neural network.

In place of intra-node signal lines 190A-1 to 190A-4, 190C-1 to 190C-4, and 190G-5 to 190G-8, the waveguide architecture of FIG. 7 instead includes inter-ring intra-node signal lines 740AG-1 to 740AG-4 and 740GA-5 to 740GA-8, signal lines connected to transmitter chip 110C and receiver chip 120C having been completely omitted in this example to provide an example of inputs and outputs of a neural network as described above. (Due to limited space, only inter-ring intra-node signal lines 740AG-1 to 740AG-4 are given reference numbers in FIG. 7. Note that, by arbitrary convention, the order of letter suffixes AG or GA refers to the direction from receiver chip to transmitter chip, while the number suffixes -1 to -4 or -5 to -8 refer to corresponding inter-node waveguides 130-1 to 130-4 or 130-5 to 130-8 of the ring of the receiver chip.) Each inter-ring intra-node signal line (e.g., inter-ring intra-node signal line 740AG-1) may be connected to an optical receiver of the first outer optical receiver group (e.g., optical receiver 120A) and an optical transmitter of the second outer optical transmitter group (e.g., optical transmitter 110G) and configured to receive an electrical signal representing a power of an optical signal received by the optical receiver and transmit the electrical signal to the optical transmitter, thereby connecting the optical receiver and the optical transmitter to form an input and an output of a neuron. Similarly, each inter-ring intra-node signal line (e.g., inter-ring intra-node signal line 740GA-5) may be connected to an optical transmitter of the first outer optical receiver group (e.g., optical transmitter 110A) and an optical receiver of the second outer optical receiver group (e.g., optical receiver 120G) and configured to receive an electrical signal representing a power of an optical signal received by the optical receiver and transmit the electrical signal to the optical transmitter, thereby connecting the optical receiver and the optical transmitter to form an input and an output of a neuron. In other words, by the use of inter-ring intra-node signal lines, optical receivers of the first ring may be connected to optical transmitters of the second ring and optical receivers of the second ring may be connected to optical transmitters of the first ring, thereby forming inter-ring nodes that may function as neurons connecting the rings. In this way, an arbitrary number of transmitters and receivers may be assembled across an arbitrary number of rings to scale the photonic neural component 100 or a neural network comprising the photonic neural component 100. Such scaling can include assembling rings into an arbitrary number of larger, higher-order rings or other structures, which may themselves be assembled into even larger, higher-order rings or other structures, and so on, to form a super-loop or super-ring. For example, if the two rings shown in FIG. 7 are regarded as first-order rings, a series of such first-order rings can be connected in a row that bends in on itself to form a larger second-order ring. Such second-order ring may then be connected to other second-order rings in the same way and so on. All such connections can be accomplished, for example, by input and output waveguides as shown in FIG. 7.

Figure 8:
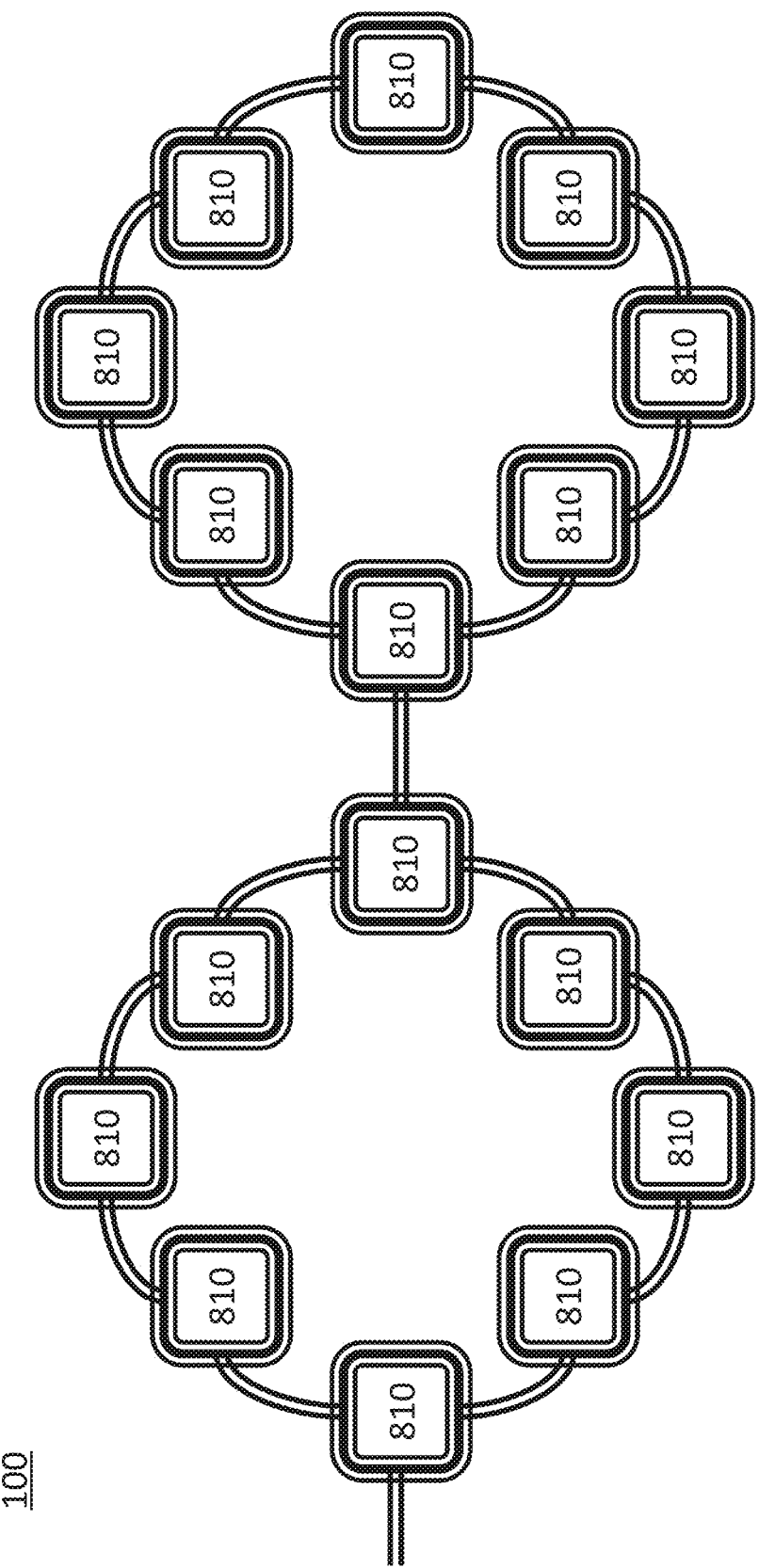
FIG. 8 shows an example schematic of a waveguide architecture for a photonic neural component according to an embodiment of the present invention.

FIG. 8 shows an example diagram of a waveguide architecture for a photonic neural component 100 according to an embodiment of the invention. In FIG. 8, a first plurality of first-order rings 810 are connected in a row that bends in on itself to form a larger second-order ring, represented by the large ring including eight first-order rings 810 on the left-hand side of the figure. A second plurality of first-order rings 810 are connected in a similar row that bends in on itself to form a larger second-order ring, represented by the large ring including eight first-order rings 810 on the right-hand side of the figure. Connections (shown as double-lines) are shown between the first-order rings 810, including one example connection connecting the two second-order rings. Each of the first-order rings 810 having two connections may be structured as the first (left-most) ring of FIG. 7, while each of the first-order rings 810 having three connections may be structured similarly to the first (left-most) ring of FIG. 7 but with an additional pair of transmitter chip 110 and receiver chip 120 moved from the inner group (containing chips 110/120 B and D in FIG. 7) to the outer group (containing chips 110/120 A and C in FIG. 7). Each of the connections in FIG. 8 thus may contain waveguides and outer transmitter/receiver chip pairs of each of the connected first-order rings 810, similar to the transmitter/receiver chips 110/120 A and G in FIG. 7. The left-most protruding connection in FIG. 8 may serve as input/output for the pair of second-order rings shown in FIG. 8 (similar to the transmitter/receiver chips 110/120C and connected waveguides in FIG. 7). The second-order rings of FIG. 8 may be connected into third-order or higher rings to scale the photonic neural component 100 or a neural network comprising the photonic neural component 100.

In the above description, the output waveguides (e.g., 710C-1), input waveguides (e.g., 730-1), and inter-ring intra-node signal lines (e.g., 740AG-1) are referred to by different names than the receiving waveguides (e.g., 170D-1), transmitting waveguides (e.g., 150D-1), and intra-node signal lines (e.g., 190H-5), respectively. However, apart from their relationship with the first and second rings, the output waveguides, input waveguides, and inter-ring intra-node signal lines may be regarded as examples of receiving waveguides, transmitting waveguides, and intra-node signal lines, respectively, and may have the same respective structures. Therefore, throughout this disclosure, any description of receiving waveguides, transmitting waveguides, and intra-node signal lines may apply equally to output waveguides, input waveguides, and inter-ring intra-node signal lines, respectively.

In FIGS. 1, 3, 7, and 8 and throughout this description, reference is made to a photonic neural component 100. The term "photonic neural component" and the corresponding reference number "100" in the drawings may refer to any component or combination of components of the waveguide architecture described throughout this disclosure, e.g., the entirety of FIG. 1, 3, 7, or 8, a portion of FIG. 1, 3, 7, or 8, a variation and/or expansion of FIG. 1, 3, 7, or 8, or any portion, variation, and/or expansion of any embodiment of the waveguide architecture described in this disclosure and not specifically depicted in the drawings, including an entire neural network. A photonic neural component 100 or neural network may also include or be connected to some means of adjusting the power of the emitted optical signals of the optical transmitters and/or the sensitivity of the optical receivers, in order to adjust the balance of the neural network. Adjustment parameters can be stored in a memory. Such means may include, for example, a computer connected to the photonic neural component 100 or neural network. Such a computer may further provide any practical functionality of the photonic neural component 100 or neural network, e.g., running a computer program that uses neural computing at least in part or cooperates with neural computing, varying the weights of the filters 180 (including output filters 720), varying reflection coefficients of the mirrors 160, issuing requests to emit optical signals from the optical transmitters, e.g., initial optical signals having instructed power, monitoring and reading the power of optical signals received by the optical receivers and returning the values to a computer program, etc. The computer may, for example, check that the same power level can be measured at all optical receivers when optical signals having the same power are instructed to be emitted by the optical transmitters and the same weights are set to all filters, and the computer may make adjustments accordingly.

As can be understood from this disclosure, the features of the photonic neural component 100 and related embodiments make it possible to avoid the drawbacks associated with conventional techniques. Using the waveguide architecture shown and described herein, a photonic neural component 100 can support photonic spike computing by optical signal transmission with low loss via waveguides formed so as to cross one another on a board, e.g., a printed circuit board. The disclosed waveguide architecture can therefore allow for design flexibility (e.g., layout, materials, etc.) while lifting the speed restriction of the conventional electronic approach.

While the embodiment(s) of the present invention has (have) been described, the technical scope of the invention is not limited to the above described embodiment(s). It is apparent to persons skilled in the art that various alterations and improvements can be added to the above-described embodiment(s). It is also apparent from the scope of the claims that the embodiments added with such alterations or improvements can be included in the technical scope of the invention.

What is claimed is:

1. A photonic neural component comprising:
   a plurality of nodes including a corresponding plurality of optical transmitters and a corresponding plurality of optical receivers;
   intra-node signal lines connecting an optical transmitter to an optical receiver at each of the plurality of nodes;
   a plurality of inter-node waveguides and connected to each of the plurality of nodes, such that each of the plurality optical transmitters and each of the plurality optical receivers are in optical communication with the plurality of inter-node waveguides with at least one transmitting waveguide corresponding to each of the plurality of optical transmitters.

2. The photonic neural component of claim 1, wherein:
   the plurality of optical transmitters include a first optical transmitter to emit a first optical signal at a first wavelength and a second optical transmitter to emit a second optical signal at a second wavelength different from the first wavelength; and
   the plurality of inter-node waveguides includes an inter-node waveguide to propagate the first optical signal at the first wavelength and the second optical signal at the second wavelength.

3. The photonic neural component of claim 1, further including a plurality of multiplexers, each multiplexer in communication with a corresponding optical transmitter, wherein the plurality of multiplexers includes a multiplexer having an entrance mirror and a y-shaped waveguide structure connected by a first entrance arm and an exit arm to the inter-node waveguide onto which the multiplexer multiplexes the input optical signal, the entrance mirror configured to receive, as the input optical signal, an optical signal transmitted by a transmitting waveguide of the plurality of transmitting waveguides and reflect the input optical signal to produce a reflected optical signal that enters a second entrance arm of the y-shaped waveguide structure and joins an optical signal propagating on the inter-node waveguide where the second entrance arm meets the first entrance aim of the y-shaped waveguide structure.

4. The photonic neural component of claim 1, further including an exchangeable filter that can be exchanged to change the weight of a signal received by at least one of the plurality of optical receivers from the plurality of inter-node waveguides.

5. The photonic neural component of claim 1, further including a variable filter whose transparency can be varied to change the weight of a signal received by at least one of the plurality of optical receivers from the plurality of inter-node waveguides.

6. The photonic neural component of claim 1, further comprising a plurality of semiconductor chips mounted on the board, each of the plurality of semiconductor chips including at least one optical transmitter or at least one optical receiver.

7. The photonic neural component of claim 1, wherein the plurality of inter-node waveguides, the plurality of transmitting waveguides, and the plurality of receiving waveguides are made of polymer in a single layer of the board.

8. The photonic neural component of claim 1, wherein the plurality of optical transmitters are divided into differential pairs in which a first optical transmitter of a differential pair emits a variable optical signal while a second optical transmitter of the differential pair emits a reference optical signal.

9. The photonic neural component of claim 1, wherein:
   the plurality of inter-node waveguides includes a first ring having two or more inter-node waveguides arranged as concentric loops;
   the plurality of optical transmitters includes a first inner optical transmitter group having two or more optical transmitters disposed inside the first ring; and
   the plurality of optical receivers includes a first inner optical receiver group having two or more optical receivers disposed inside the first ring.

10. The photonic neural component of claim 2, further including plurality of mirrors, each mirror in optical communication between the plurality of inter-node waveguides and a corresponding optical receiver, wherein each mirror includes at least one mirror having a reflection coefficient dependent on wavelength.

11. The photonic neural component of claim 6, wherein:
    the plurality of semiconductor chips includes optical transmitter chips and optical receiver chips, each of the optical transmitter chips including one or more of the plurality of optical transmitters and each of the optical receiver chips including one or more of the plurality of optical receivers; and
    the optical transmitter chips include a first optical transmitter chip whose one or more optical transmitters emit first optical signals at a first wavelength and a second optical transmitter chip whose one or more optical transmitters emit second optical signals at a second wavelength different from the first wavelength.

12. The photonic neural component of claim 6, wherein:
    each of the plurality of semiconductor chips is positioned such that the at least one optical transmitter included in a semiconductor chip or the at least one optical receiver included in the semiconductor chip faces the board;
    a plurality of transmitting waveguides are connected to the plurality of optical transmitters via entry mirrors configured to redirect light from a direction perpendicular to the board to a direction parallel to the board; and
    a plurality of receiving waveguides are connected to the plurality of optical receivers via exit mirrors configured to redirect the light from the direction parallel to the board to the direction perpendicular to the board.

13. The photonic neural component of claim 6, wherein each of the intra-node signal lines connected to a respective optical receiver of the plurality of optical receivers and a respective optical transmitter of the plurality of optical transmitters and configured to receive an electrical signal representing a power of an optical signal received by the optical receiver and transmit the electrical signal to the optical transmitter, thereby connecting the optical receiver and the optical transmitter to form an input and an output of a neuron.

14. The photonic neural component of claim 8, further comprising a plurality of semiconductor chips mounted on the board, each of the plurality of semiconductor chips including one or more of the differential pairs.

15. The photonic neural component of claim 9, further comprising:
   a plurality of mirrors including a first mirror group, each mirror of the first mirror group configured to partially reflect an optical signal propagating on an inter-node waveguide of the first ring to produce the reflected optical signal; and
   a plurality of first output waveguides such that at least one first output waveguide crosses at least one inter-node waveguide of the first ring with a core of one of a crossing waveguide passing through a core or a clad of another crossing waveguide, each first output waveguide connected to outside the first ring and configured to receive the reflected optical signal produced by a first mirror of the first minor group and transmit the reflected optical signal to outside the first ring.

16. The photonic neural component of claim 9, further comprising:
   a plurality of multiplexers including a first multiplexer group, each multiplexer of the first multiplexer group configured to multiplex the input optical signal onto an inter-node waveguide of the first ring; and
   a plurality of first input waveguides such that at least one first input waveguide crosses at least one inter-node waveguide of the first ring with a core of one crossing waveguide passing through a core or a clad of another crossing waveguide, each first input waveguide connected to outside the first ring and configured to receive an optical signal from outside the first ring and transmit the optical signal to an inter-node waveguide of the first ring via a multiplexer of the first multiplexer group.

17. The photonic neural component of claim 10, further including a spectral filter configured to apply a weight dependent on the wavelength to a signal received by at least one of the plurality of optical receivers from the plurality of inter-node waveguides.

18. The photonic neural component of claim 11, wherein:
   each of the optical transmitter chips includes a same number of optical transmitters;
   each of the optical receiver chips includes a same number of optical receivers;
   a number of optical transmitters included in each of the optical transmitter chips is the same as a number of optical receivers included in each of the optical receiver chips; and
   a number of inter-node waveguides connected to each of the optical transmitter chips via a plurality of transmitting waveguides is the same as the number of optical transmitters included in each of the optical transmitter chips and the number of optical receivers included in each of the optical receiver chips.

19. The photonic neural component of claim 13, further including a plurality of mirrors includes at least one mirror whose reflected optical signal is transmitted to the optical receiver and whose reflection coefficient is substantially zero for a wavelength of the optical signal emitted by the optical transmitter.

20. The photonic neural component of claim 14, wherein each of the plurality of semiconductor chips includes two or more of the differential pairs.

* * * * *